(12) United States Patent
Mullig et al.

(10) Patent No.: US 7,930,419 B2
(45) Date of Patent: Apr. 19, 2011

(54) SYSTEM AND METHOD FOR DELIVERING VIDEO AND AUDIO CONTENT OVER A NETWORK

(75) Inventors: Richard Montgomery Mullig, Atlanta, GA (US); Anwer Sultan, Marietta, GA (US); Aaron Christopher Tighe, Atlanta, GA (US)

(73) Assignee: Turner Broadcasting System, Inc.

( * ) Notice: Subject to any disclaimer, the term of this patent is extended or adjusted under 35 U.S.C. 154(b) by 938 days.

(21) Appl. No.: 11/566,561

(22) Filed: Dec. 4, 2006

(65) Prior Publication Data

US 2007/0143493 A1    Jun. 21, 2007

Related U.S. Application Data

(60) Provisional application No. 60/742,537, filed on Dec. 4, 2005.

(51) Int. Cl.
*G06F 15/16* (2006.01)
*G06F 3/00* (2006.01)

(52) U.S. Cl. .................................. 709/231; 715/700

(58) Field of Classification Search .................. 709/220, 709/201, 219, 217, 218, 249, 238, 232, 224, 709/226, 203, 245, 231; 707/501, 505, 506, 707/530, 513; 715/215, 735, 736, 740, 700, 715/762, 761; 370/230, 231, 232, 352, 389, 370/229, 254, 360; 705/5, 6, 1, 28, 26, 27, 705/56, 35, 37, 44, 10, 14, 30, 7
See application file for complete search history.

(56) References Cited

U.S. PATENT DOCUMENTS 5,537,141 A * 7/1996 Harper et al. ................. 725/116
6,769,127 B1 * 7/2004 Bonomi et al. ................. 725/39
7,298,370 B1 * 11/2007 Middler et al. ............... 345/421
2002/0069265 A1 * 6/2002 Bountour et al. ............. 709/219
2002/0144259 A1   10/2002 Gutta et al.
2003/0126605 A1    7/2003 Betz et al.

(Continued)

FOREIGN PATENT DOCUMENTS

EP            0895417          2/1999

(Continued)

OTHER PUBLICATIONS

Annex to Form PCT/ISA/206, partial International Search Report for PCT/US2006/046202, dated May 16, 2007.
International Preliminary Report on Patentability for PCT/US2006/046202, dated Jun. 19, 2008.
International Search Report and Written Opinion for PCT/US2006/046202, dated Apr. 4, 2008.

*Primary Examiner* — Joseph E Avellino
*Assistant Examiner* — Mark O Afolabi
(74) *Attorney, Agent, or Firm* — Alston & Bird LLP

(57) ABSTRACT

A content delivery system according to various embodiments of the invention substantially concurrently streams a plurality of live videos to a client computing device over a network, allowing the user to view two or more live videos at the same time. In a particular embodiment, the system is configured to display a high resolution version of a live video feed in a "primary" pane of a main display dialog window and one or more additional live video feeds in low resolution in "preview" panes of the main display dialog window substantially concurrently, wherein the additional live video feeds are different from the first video feed and each other. In this particular embodiment, the system allows the user to preview the additional videos while the first video is playing. In addition, according to one embodiment, the live video feeds may be from independent sources.

44 Claims, 20 Drawing Sheets

U.S. PATENT DOCUMENTS

| | | |
|---|---|---|
| 2003/0159143 A1 * | 8/2003 | Chan .............................. 725/41 |
| 2004/0117853 A1 | 6/2004 | Karaoguz et al. |
| 2004/0216173 A1 | 10/2004 | Horoszowski et al. |
| 2005/0071886 A1 | 3/2005 | Deshpande |
| 2006/0004646 A1 * | 1/2006 | Schoen et al. ................. 705/37 |

FOREIGN PATENT DOCUMENTS

| | | |
|---|---|---|
| EP | 1388858 | 2/2004 |
| WO | WO 00/13416 * | 3/2000 |
| WO | WO 2003/026250 | 3/2003 |
| WO | WO 2004/064296 A2 | 7/2004 |

* cited by examiner

SYSTEM AND METHOD FOR DELIVERING VIDEO AND AUDIO CONTENT OVER A NETWORK

CROSS REFERENCE TO RELATED APPLICATIONS

This application claims priority from U.S. Provisional Patent Application Ser. No. 60/742,537, entitled "System and Method for Delivering Video and Audio Content Over a Network", filed on Dec. 4, 2005, the contents of which are herein incorporated by reference in their entirety.

BACKGROUND OF THE INVENTION

Live and on-demand media content is widely available for streaming or downloading over the Internet. The media content can be played on a user's computing device using a media player, such as Windows Media Player™, QuickTime™, RealPlayer™, and Adobe Flash Player™, which decompresses, decodes, and presents the media content to the user. However, the media players currently available are configured to play only one media stream at a time.

In addition, websites accessible over the Internet provide the user with the option to view live videos and pre-recorded, on-demand videos, but currently available websites do not provide the user with the ability to preview a video before selecting it for viewing or to view more than one live video at a time.

Thus, a need in the art exists for an improved content delivery system that allows the user to receive live media content and view two or more videos substantially concurrently and that provides an enhanced entertainment experience for the user.

BRIEF SUMMARY OF THE INVENTION

A content delivery system according to various embodiments of the invention substantially concurrently streams a plurality of live videos to a client computing device over a network, allowing the user to view two or more live videos at the same time. In a particular embodiment, the system is configured to display a high resolution version of a live video feed in a "primary" pane of a main display dialog window and one or more additional live video feeds in low resolution in "preview" panes of the main display dialog window substantially concurrently, wherein the additional live video feeds are different from the first video feed and each other. In this particular embodiment, the system allows the user to preview the additional videos while the first video is playing. In addition, according to one embodiment, the live video feeds may be from independent sources. An exemplary main display dialog window according to one embodiment is shown in FIG. 4.

In addition, the system according to various embodiments allows the user to select (e.g., click on) one of the live videos playing in low resolution in one of the preview video panes to be displayed in the primary video pane in high resolution. When the user selects a particular video feed playing in one of the preview video panes, the system displays the high resolution version of the selected video feed in the primary video pane and displays the low resolution version of the video feed that was previously playing in the primary video pane in one of the preview video panes. According to one embodiment, the videos that are displayed in the preview video panes may be chosen at the content delivery server, and in another embodiment, the system is configured to allow the user to choose the videos to be played in the preview video panes from a list of available videos.

The system, according to various embodiments, provides the user with digital video recorder (DVR) functionality for one or more of the live video feeds. For example, the system allows the user to pause the video feed, fast forward the video feed after pausing or rewinding, rewind the video feed, and record the video feed. According to one embodiment, this functionality is provided by interfacing with the controls provided by one or more video players that reside on the client computing device (e.g., Windows Media Player™, QuickTime™, RealPlayer™, and Adobe Flash Player™). In another embodiment, the system allows the user to pause, fast forward, and rewind all of the video feeds together while maintaining the synchronization of the video feeds.

Furthermore, in one embodiment, the user can record a live video stream to a local storage device in the client computing device. In a particular embodiment, the user can associate the recorded live video stream with a particular genre and/or associate the recorded video with a user-specific group (e.g., "My Group" group). In addition, according to one embodiment, the system identifies an "event start" tag associated with the beginning of the streaming video file and begins recording from this point, and the system identifies an "event end" tag associated with the end of the streaming video file that instructs the system to stop recording. Thus, in this embodiment, the system records the streaming video file based on the actual beginning and end of the file, and not based on the time window in which the video file is scheduled to be streamed.

According to various embodiments of the invention, the system is configured to allow the user to select various display modes for displaying the content provided by the system. For example, the user can view only the video feed playing in the primary video pane (i.e., without the surrounding text and preview video panes) by selecting a "video only" display mode. In addition, by selecting a "shrink expanded" display mode, the user can view the video feed playing in the primary video pane in a smaller sized video pane with at least a portion of the text shown in the main display dialog window, but without the preview video panes. And, in a further embodiment, the user can select a "shrink collapsed" mode, which displays the smaller sized video pane displaying the video feed without any associated text. Furthermore, in one embodiment, the system further provides for video continuity when switching among the various display modes.

According to various embodiments of the invention, the system is further configured to stream on-demand videos to the user and to provide the user with the ability to search for and/or browse available content (e.g., live video feeds or on-demand videos). In addition, in an "expanded" display mode of the search and/or browse dialog window, the system according to one embodiment provides a video pane adjacent to the search results in the search dialog window or available content list in the browse dialog window, and the video pane continues to play the video that was being played before the search or browse options were selected by the user, allowing the user to search or browse other content without interrupting the currently streaming video. Furthermore, the system according to one embodiment, allows a user to preview a particular video that is listed in the search dialog window or browse dialog window in the video pane. For example, if the user, while watching a particular live video feed in the main display dialog window, decides to browse for other available content, the user can continue watching the live video feed while browsing other available content in the browse dialog window. When the user wants to preview a particular video listed in the browse dialog window, the user selects (e.g. clicks on) the particular video listing and the video is displayed in the video pane instead of the previously viewed live video feed.

Furthermore, in various embodiments of the invention, the system alerts users when new live video feeds are available and/or when breaking news is being reported by the content delivery system. The alerts, according to one embodiment, are displayed in an alert pane in the main display dialog window or in the shrink expanded dialog window. In another embodiment, alerts are displayed in a pop-up alert dialog window that is displayed adjacent to a system icon displayed in the user's system tray. Upon viewing the alert, the user can click within the alert dialog box (e.g., on the title of the alert or on an icon) to view the live video feed or breaking news in the main display dialog window, select an icon within the alert dialog window to record the live video feed highlighted in the alert, or selected a "close" icon to close the alert dialog window.

In addition, according to one embodiment, the system is configured to deliver "shout downs", which are audio streams that announce breaking news or upcoming program changes, for example, to the client computing device. In one embodiment, the user can toggle between having the shout downs interrupt the audio associated with a video that is playing and having the shout downs muted. The shout downs, according to one embodiment, are delivered independently from the streaming video that is being displayed in the primary video pane. In addition, in one embodiment, the user can specify for the client application to reduce the decibel level of the audio content associated with the video that is playing when the shout down is received.

According to various embodiments of the invention, the system provides a list of all live video feeds that are scheduled to be streamed during a particular time period (e.g., next twelve hours, next twenty-four hours, that day, or that week). The user can select (e.g., click on) a particular live video feed from the list to instruct the system to remind the user before the live video feed is set to start streaming (e.g., five minutes prior to the scheduled start time).

In addition, the system is configured to display text and links to other information (e.g., websites) that is relevant to the particular video being displayed in the primary video pane, according to one embodiment. For example, the system can provide summary text (e.g., a blog) and links to websites or other on-demand video and audio content that are related to the particular video being displayed in the primary video pane. In one embodiment, the text and links are pushed out to the client computing device and/or retrieved by the client computing device upon request.

In one embodiment, the system is configured for determining whether the user of the client computing device is actively viewing video content, and in response to determining that the user is not actively viewing video content, ceasing delivery of content to the user's computing device. If the user is determined to be actively viewing video content, the system continues to stream the video content to the user, according to one embodiment. For example, the system may determine whether the user is actively viewing video content by requesting that the user provide input to the system or by monitoring the input from the user over a particular time period (e.g., 5 minutes, 10 minutes, or 15 minutes). In addition, the system may determine that the user is not actively viewing video content if the user interface is minimized.

BRIEF DESCRIPTION OF THE DRAWINGS

Figure 1:
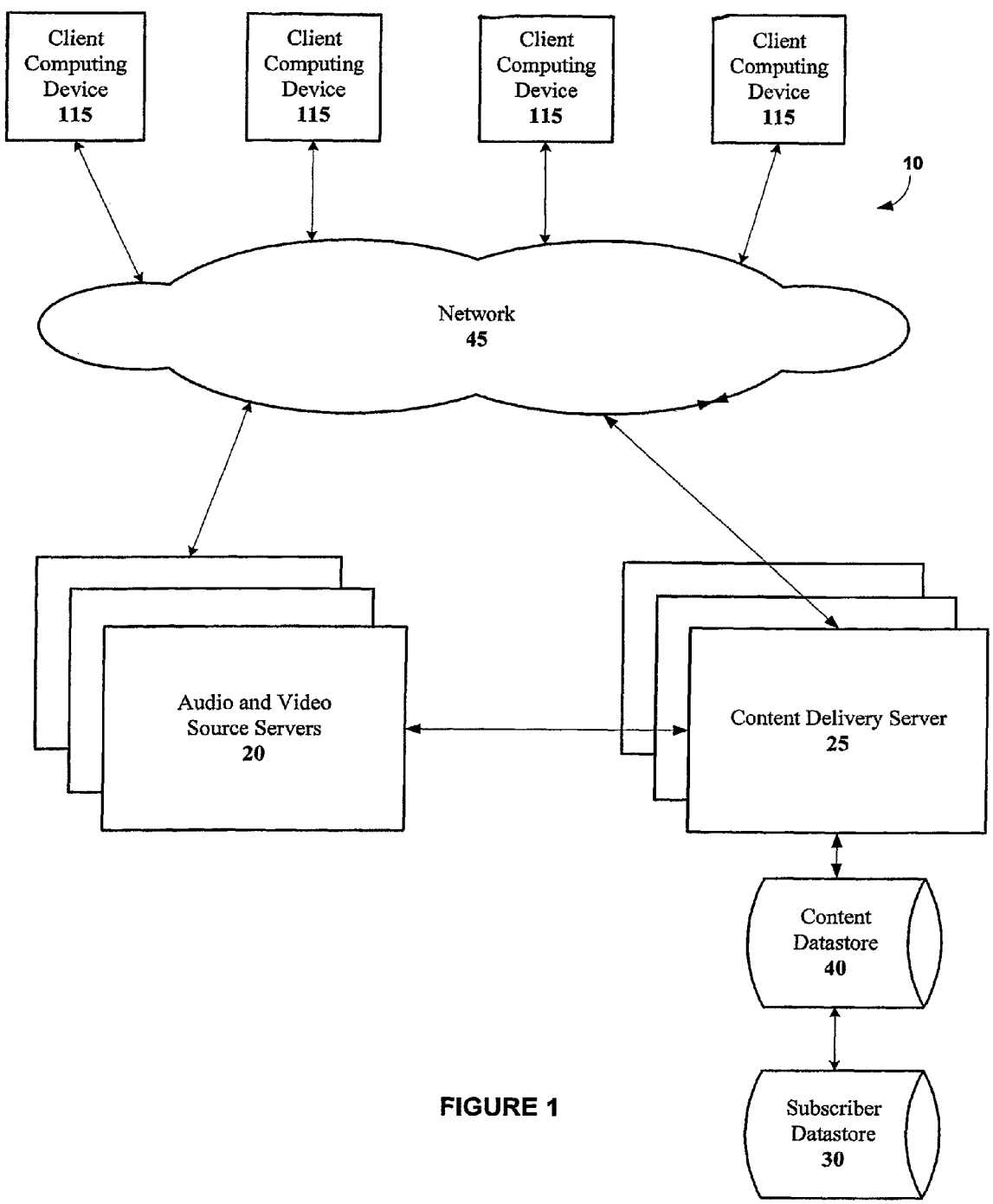

Having thus described the invention in general terms, reference will now be made to the accompanying drawings, which are not necessarily drawn to scale, and wherein:

FIG. 1 is a block diagram of a content delivery system according to an embodiment of the present invention.

Figure 2:
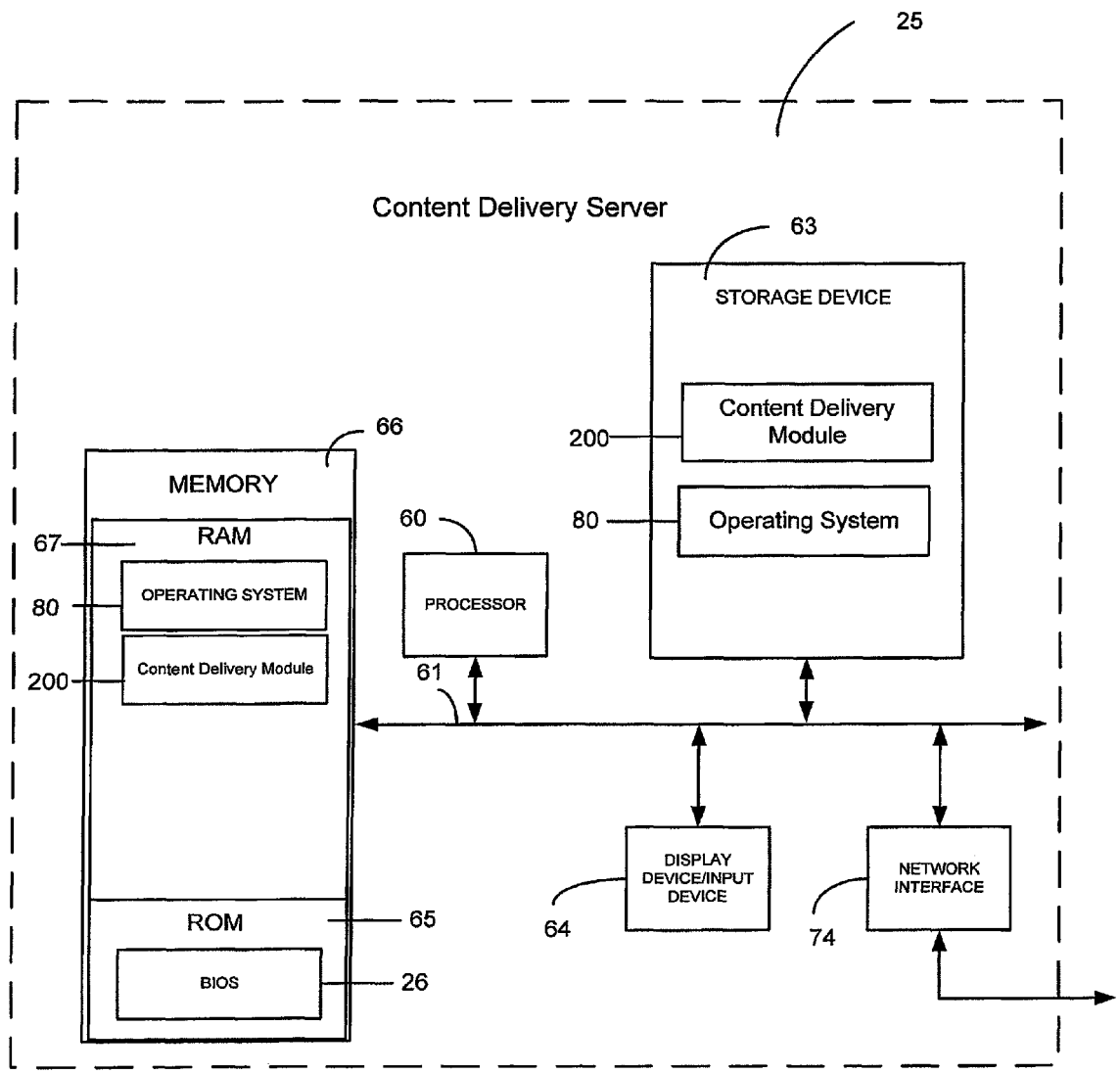

FIG. 2 is a diagram of a content delivery server according to one embodiment of the present invention.

Figure 3:
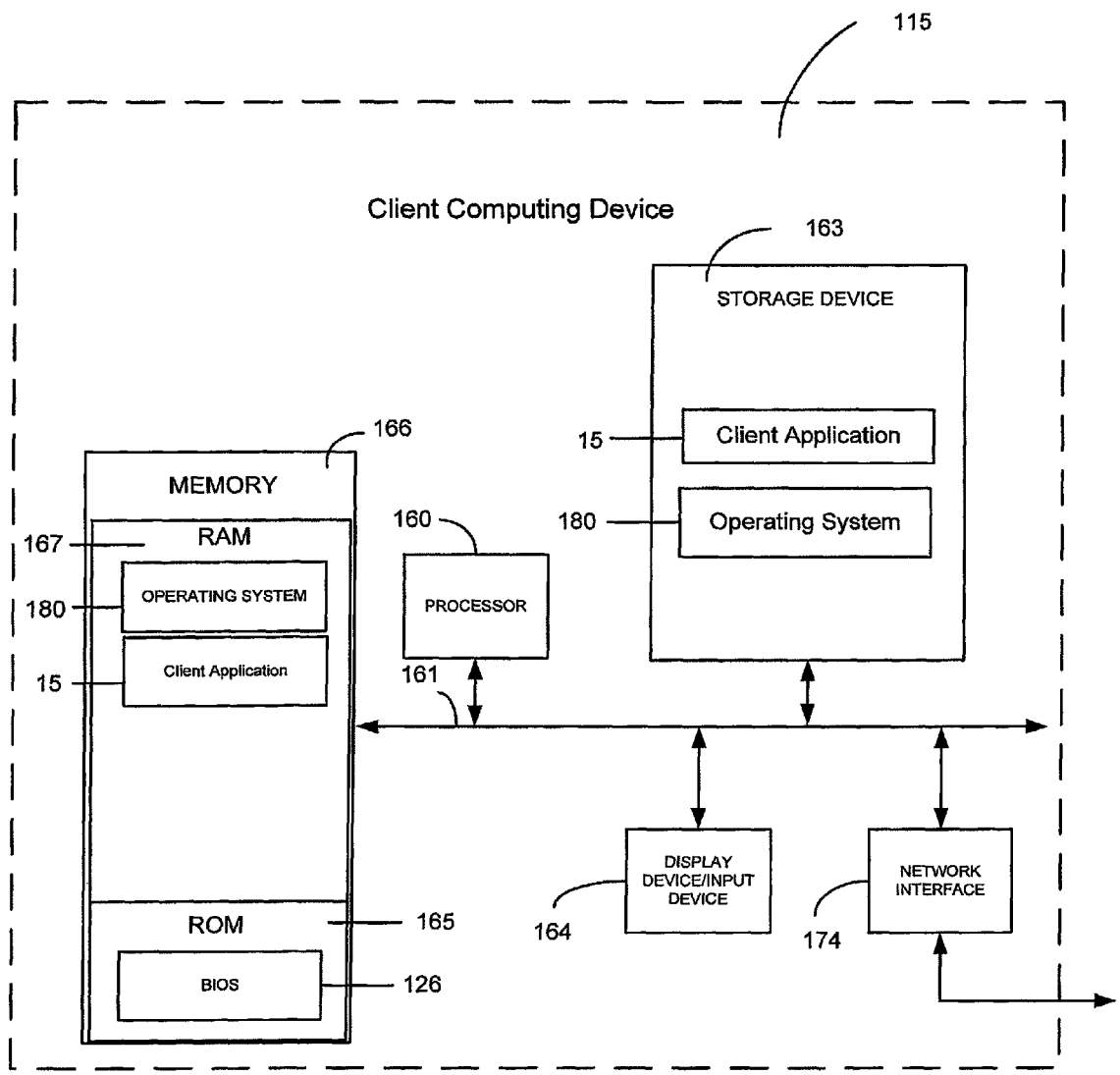

FIG. 3 is a diagram of a client computing device according to one embodiment of the present invention.

Figure 4:
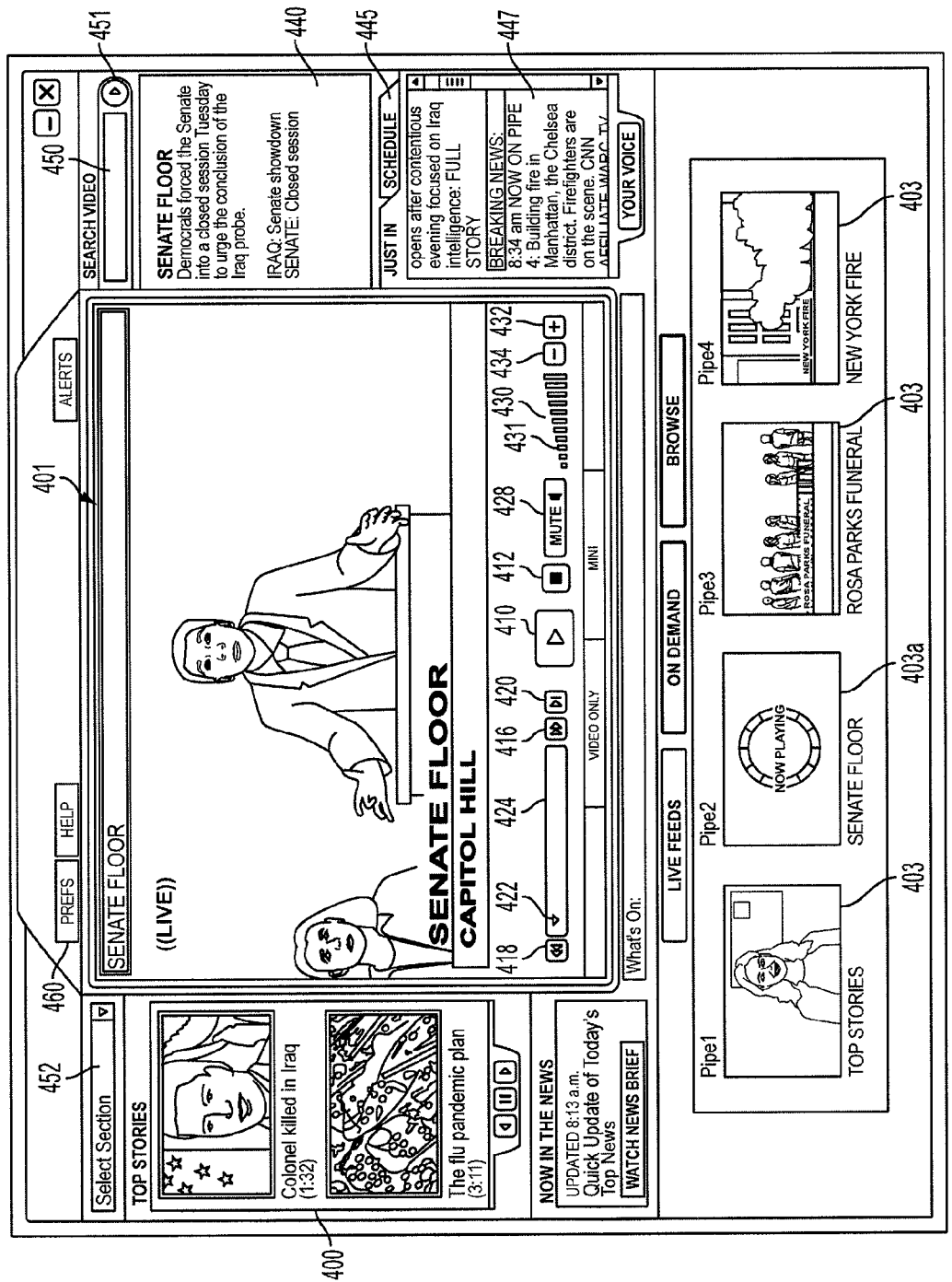

FIG. 4 is a graphic illustration of an exemplary main display dialog window according to one embodiment of the invention.

Figure 5A:
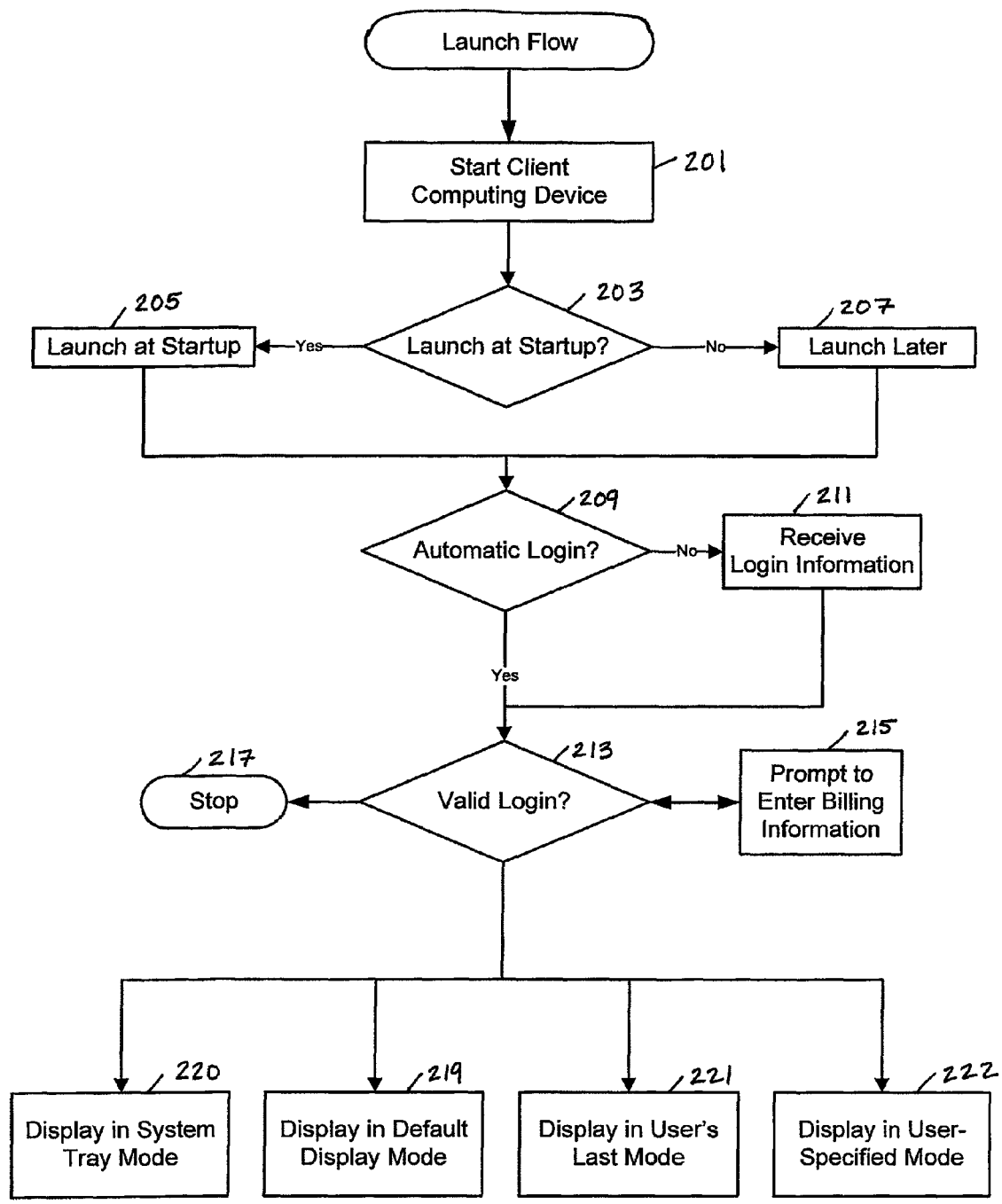

FIG. 5A is a flowchart illustrating the steps of launching a client application from the client computing device according to one embodiment of the invention.

Figure 5B:
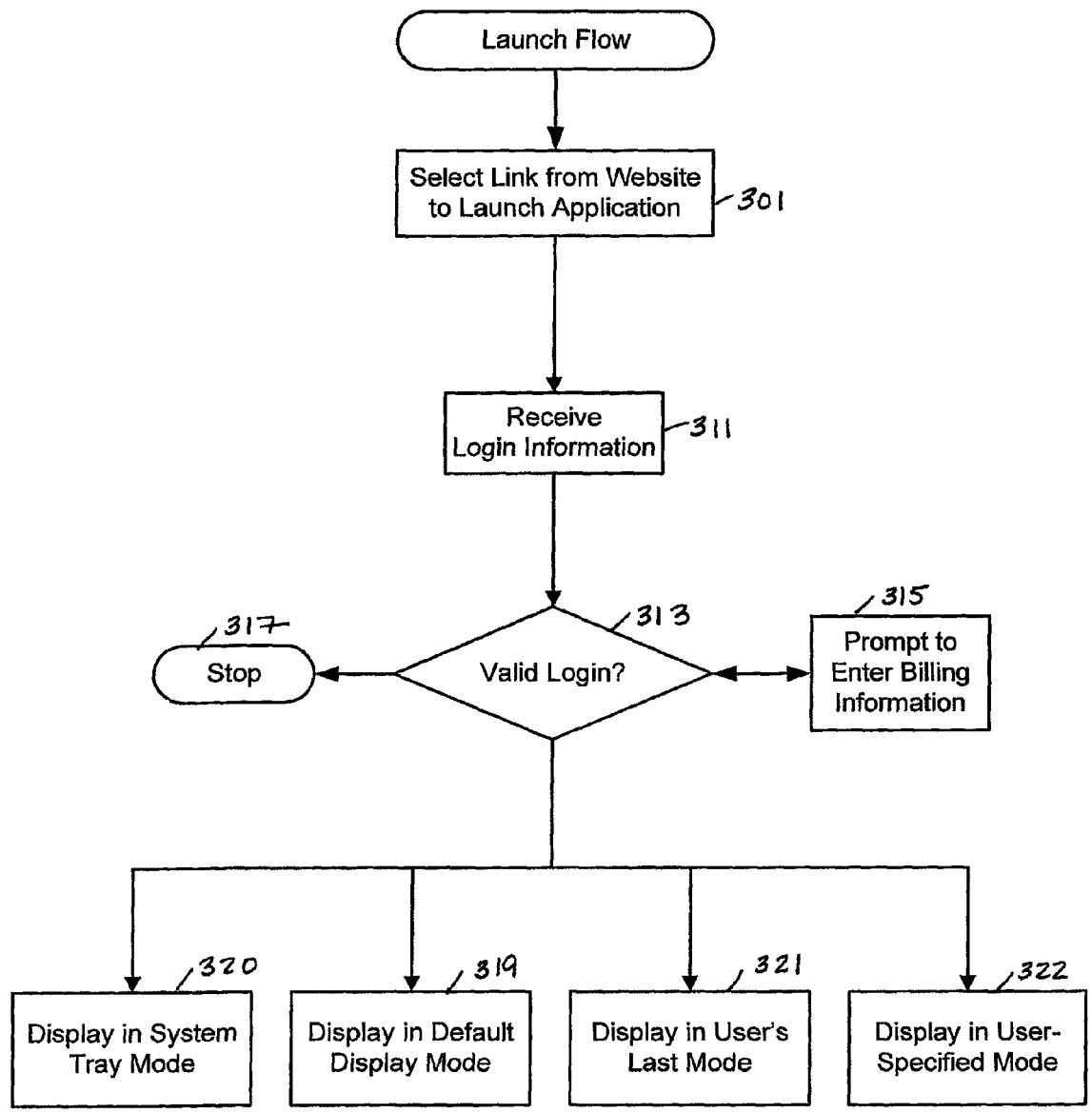

FIG. 5B is a flowchart illustrating the steps of launching a client application from a website according to one embodiment of the invention.

Figure 6:
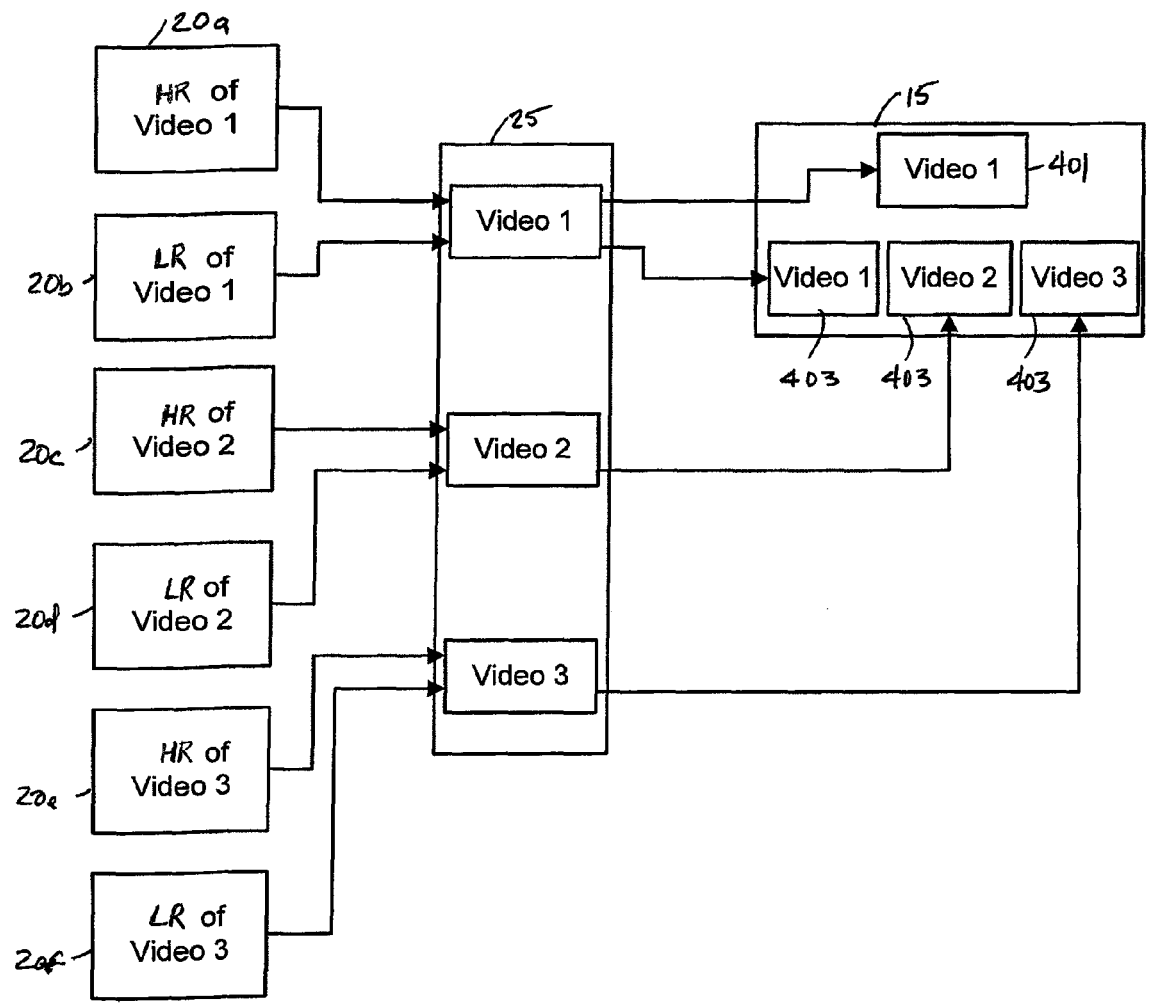

FIG. 6 is a block diagram of a content delivery system according to an embodiment of the present invention.

Figure 7:
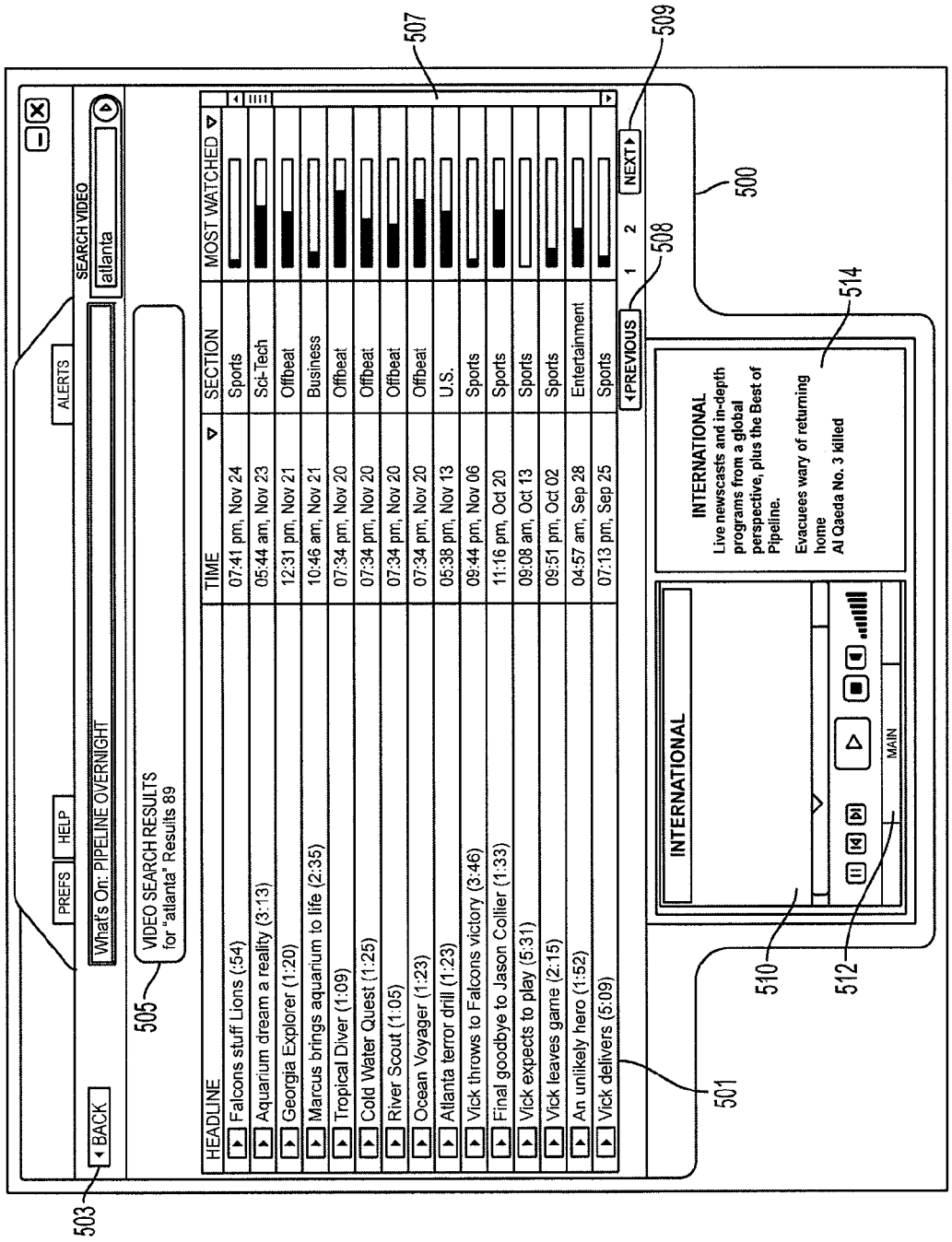

FIG. 7 is a graphic illustration of an exemplary search dialog window according to one embodiment of the invention.

Figure 8:
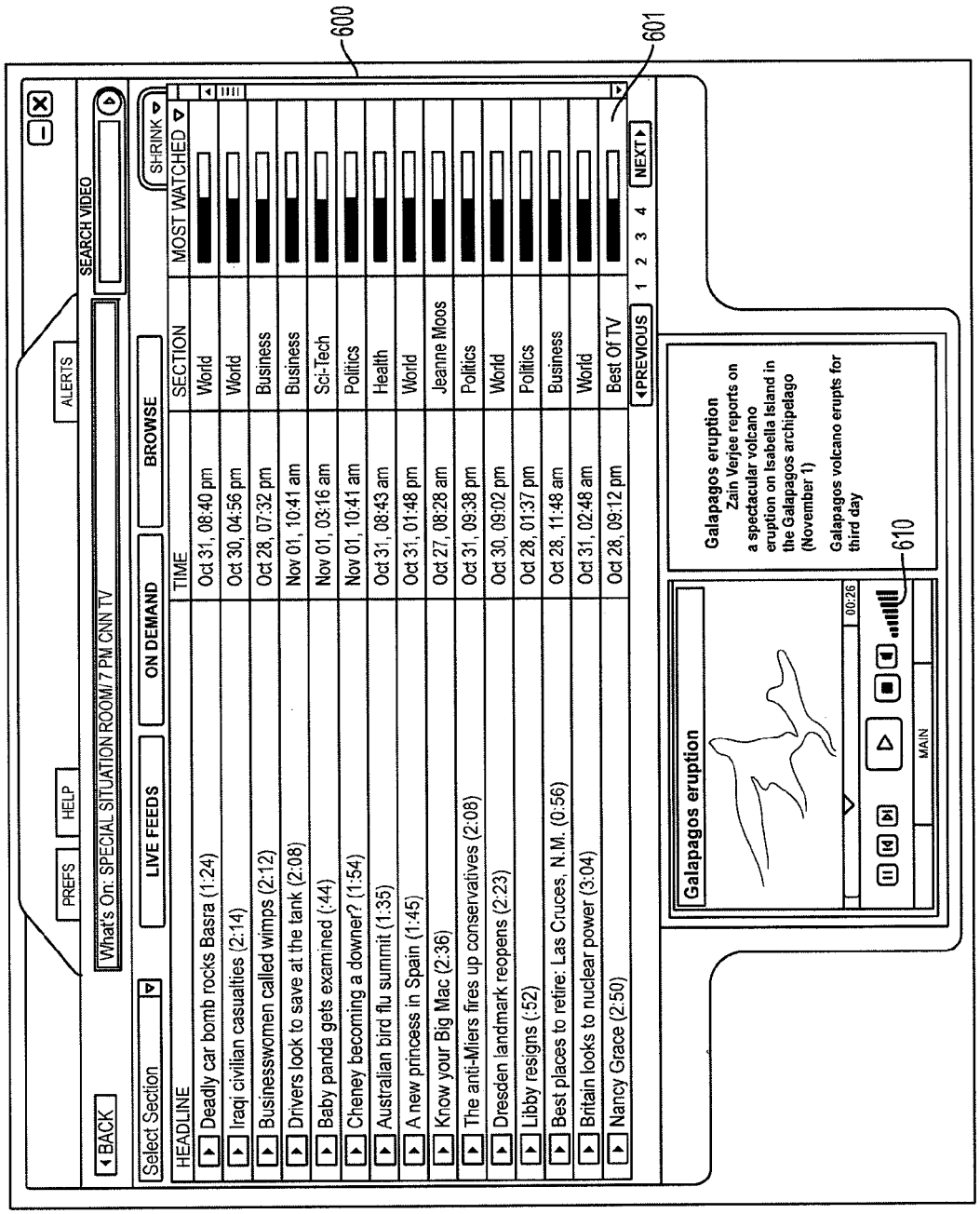

FIG. 8 is a graphic illustration of an exemplary browse dialog window according to one embodiment of the invention.

Figure 9:
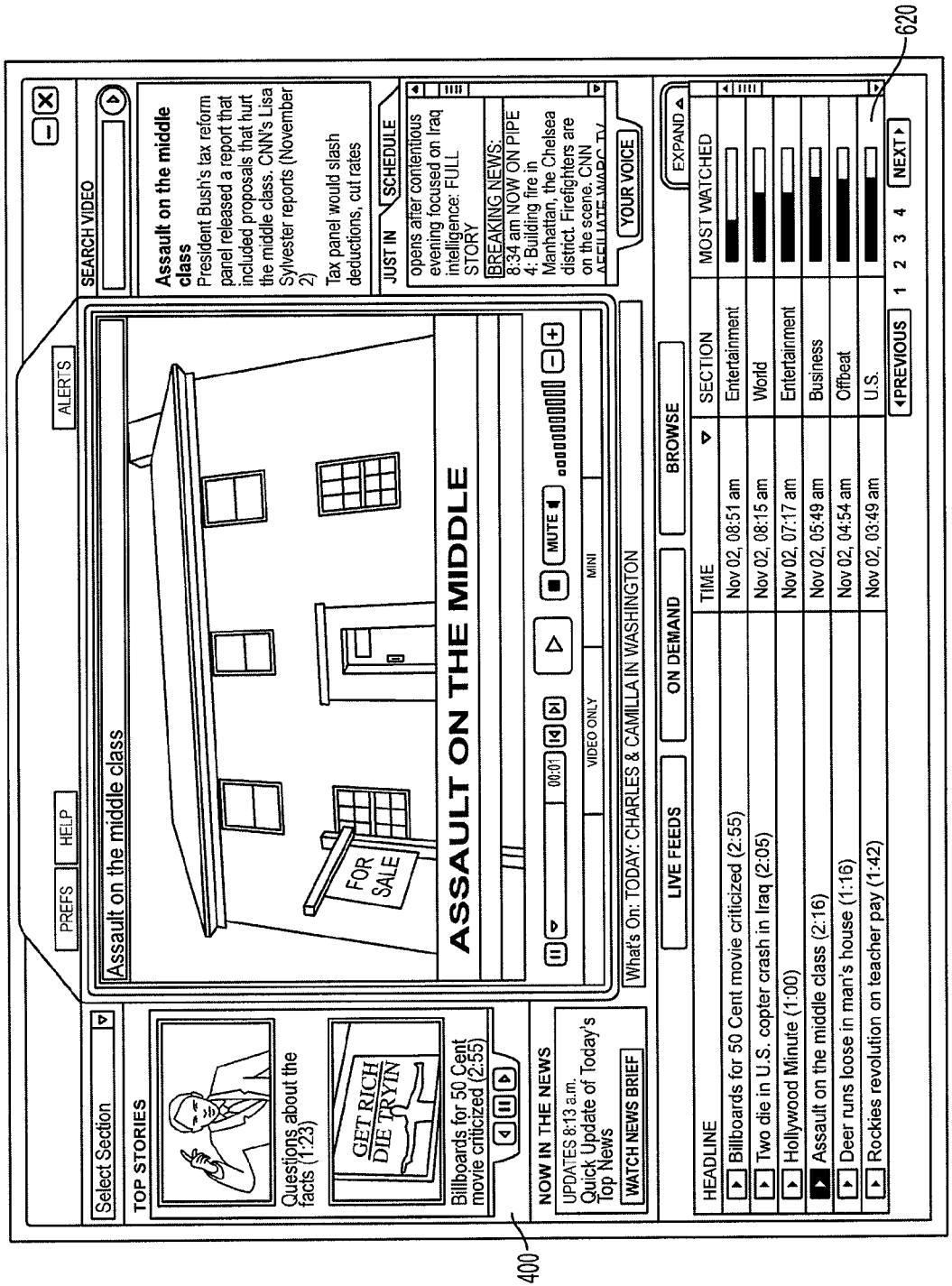

FIG. 9 is a graphic illustration of an exemplary browse dialog window according to one embodiment of the invention.

Figure 10:
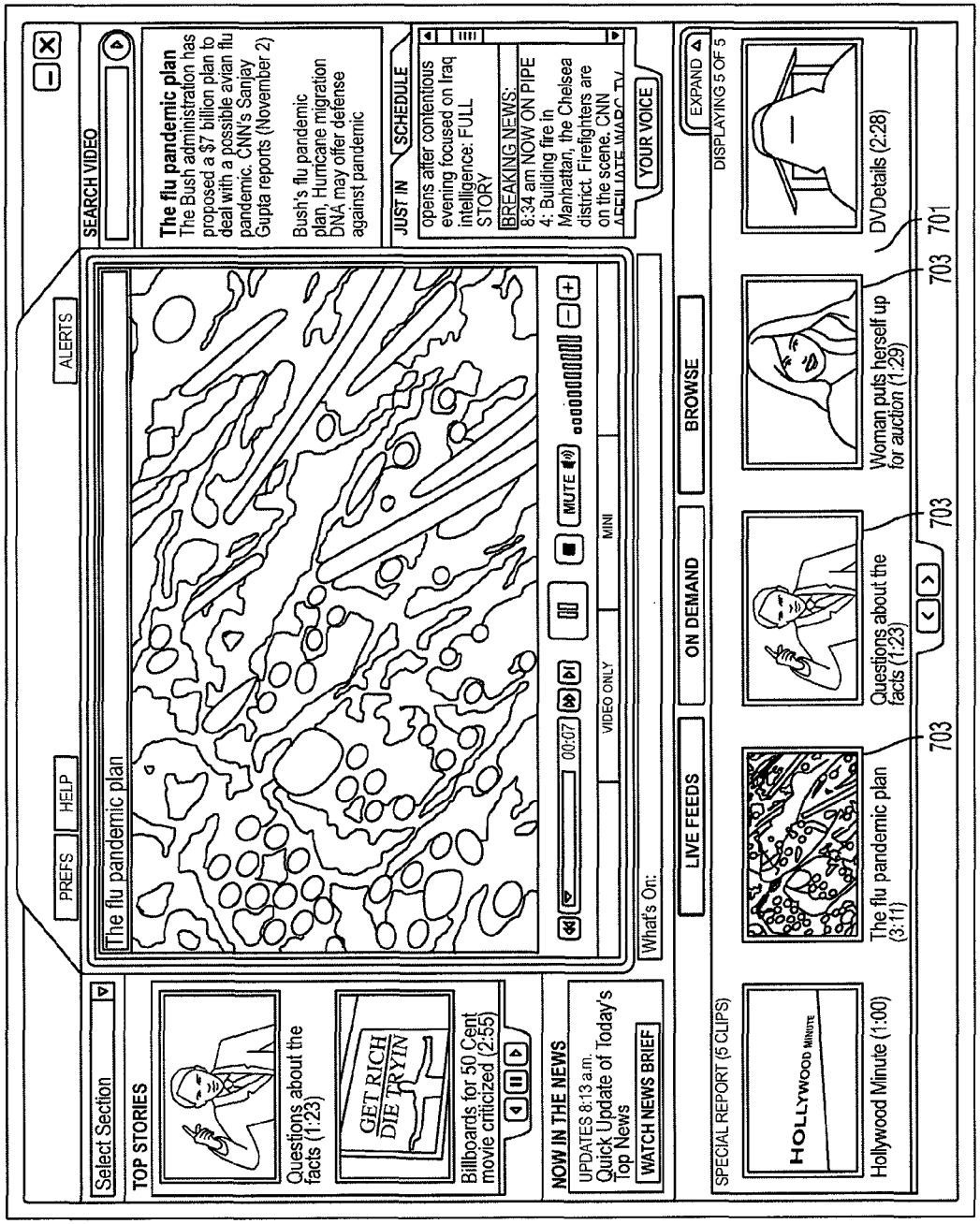

FIG. 10 is a graphic illustration of an exemplary browse dialog window according to one embodiment of the invention.

Figure 11:
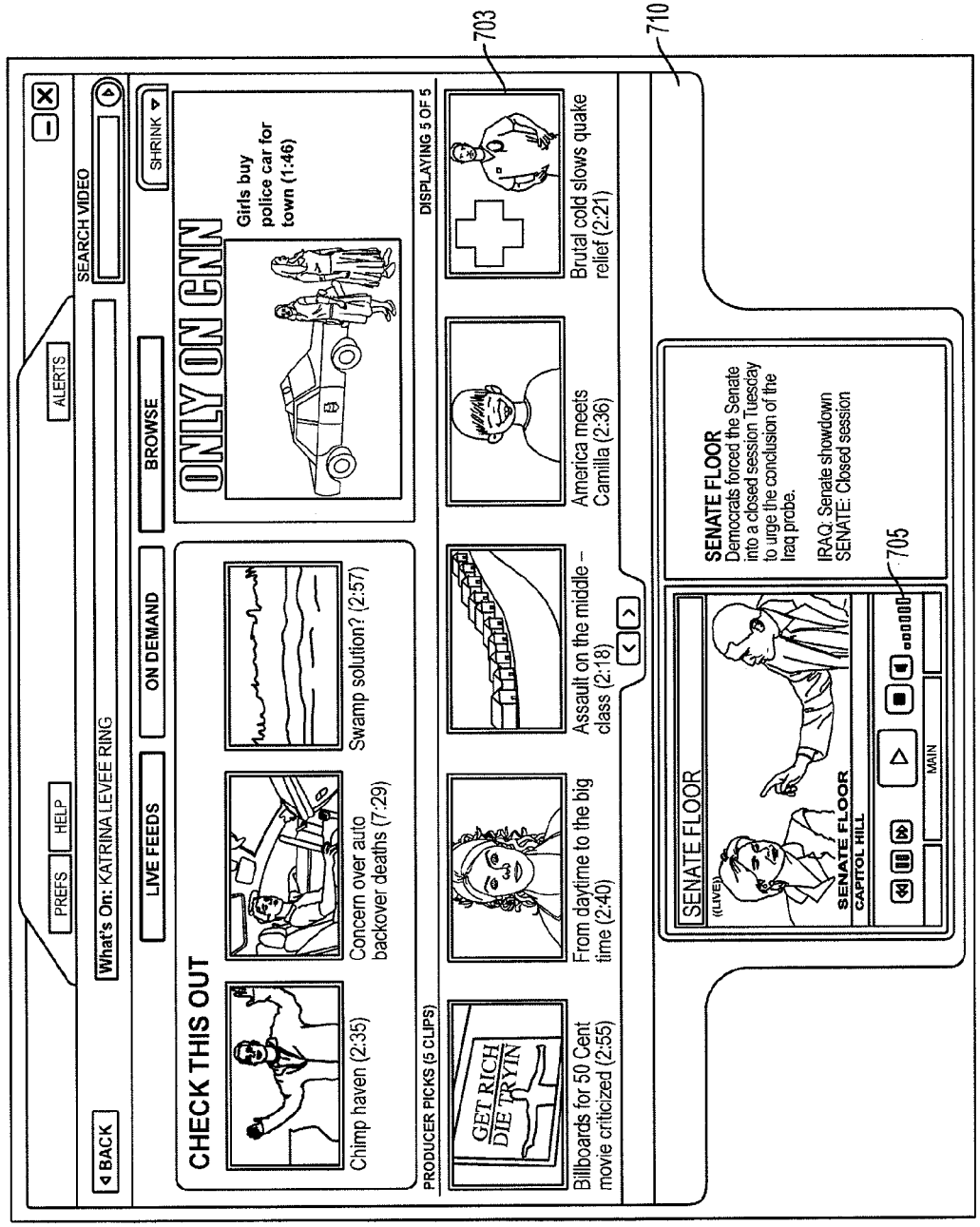

FIG. 11 is a graphic illustration of an exemplary browse dialog window according to one embodiment of the invention.

Figure 12:
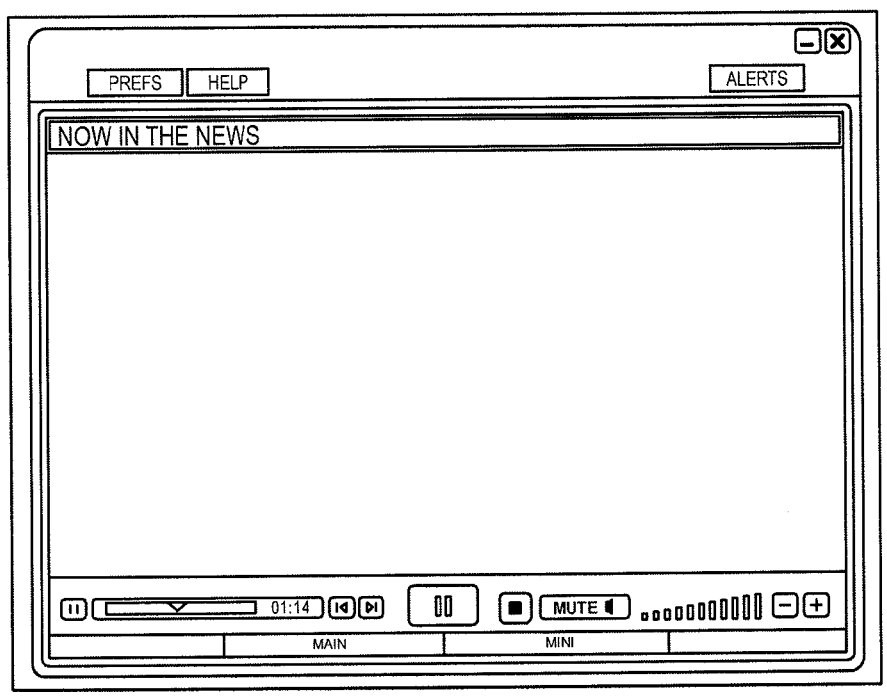

FIG. 12 is a graphic illustration of an exemplary video only dialog window according to one embodiment of the invention.

Figure 13:
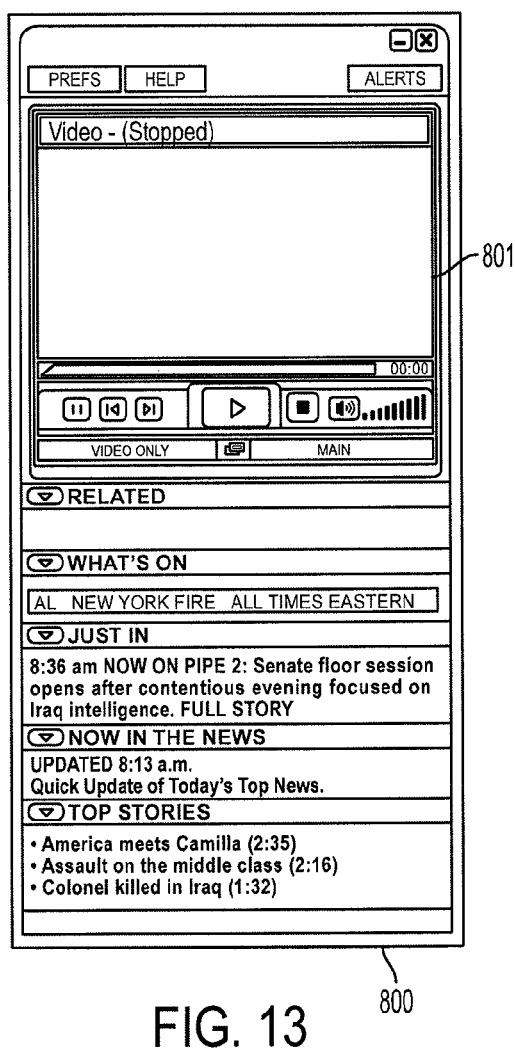

FIG. 13 is a graphic illustration of an exemplary shrink expanded dialog window according to one embodiment of the invention.

FIGS. 14-17 are graphic illustrations of an exemplary user preferences dialog window according to one embodiment of the invention.

Figure 18:
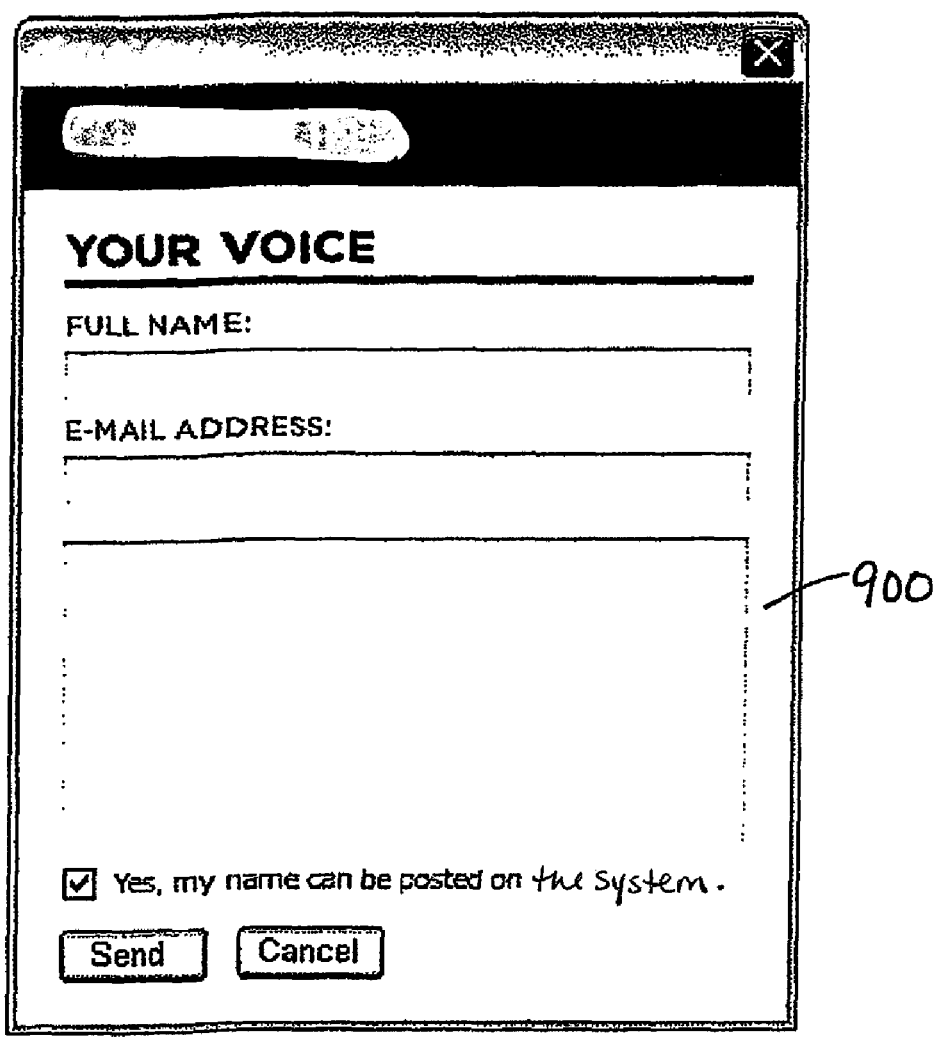

FIG. 18 is a graphic illustration of an exemplary commentary dialog window according to one embodiment of the invention.

Figure 19:
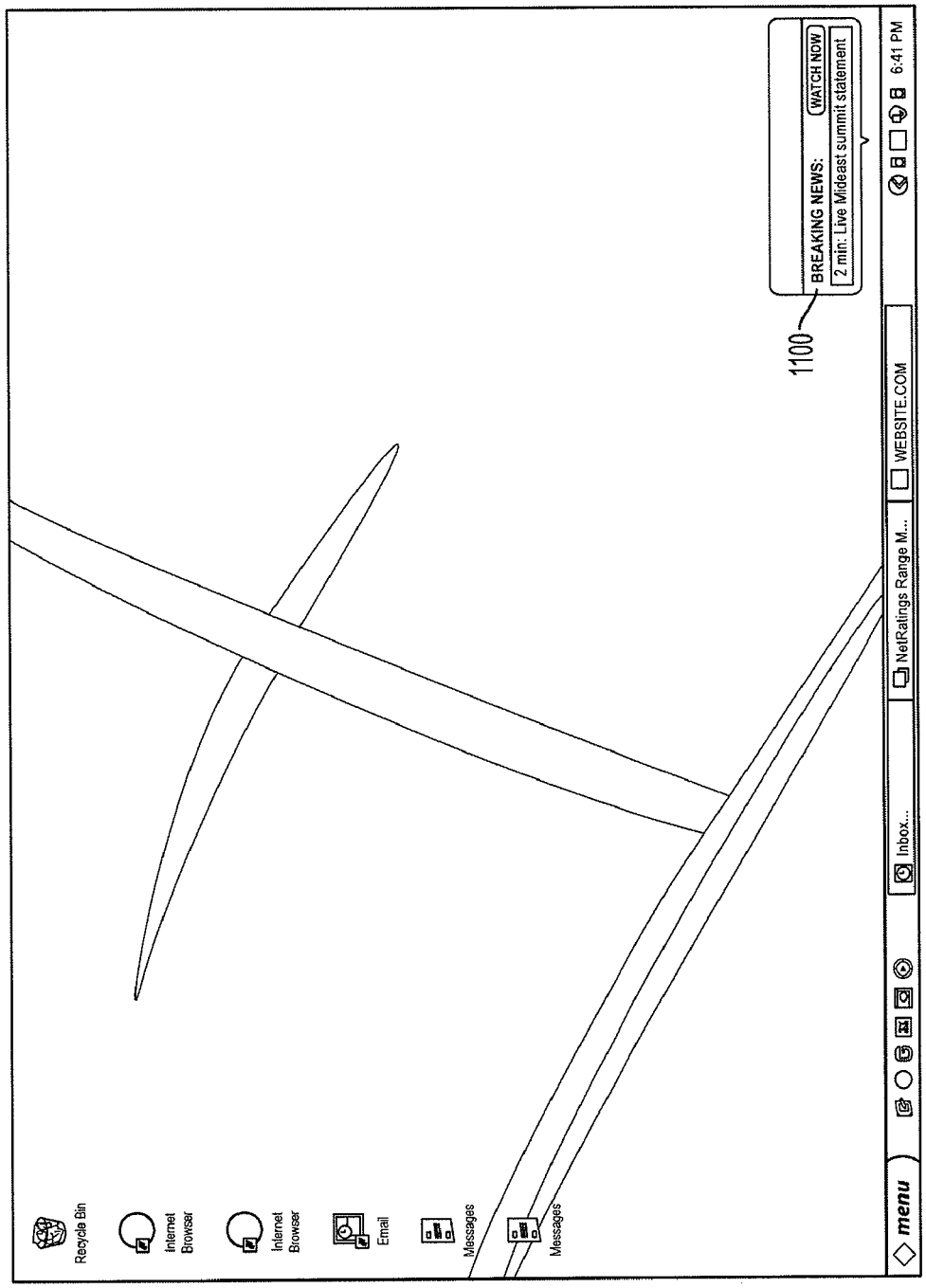

FIG. 19 is a graphic illustration of an exemplary alert dialog window according to one embodiment of the invention.

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

FIG. 1 illustrates a high-level block diagram of a content delivery system 10 according to various embodiments of the invention. In various embodiments, the system 10 includes one or more client computing devices 115 (e.g., a PC, a Mac, or a portable computing device) that are configured to communicate via a network 45 (e.g., a LAN, the Internet, or a wireless area network) with a content delivery server 25. The content delivery server 25 according to various embodiments may include one or more logical servers deployed on one or more physical servers. And, according to various embodiments, the client computing devices 115 execute a client application 15 that is configured to communicate with the content delivery server 25, request content from the content delivery server 25, and receive, manage, and display content distributed from the content delivery server 25.

In various embodiments, the various client computing devices 115 are distributed over a large geographical area and the network 45 is a wide area network, such as the Internet. The volume of content data that is passed to the client application 15 is typically sufficiently large that a broadband link is used to handle the communication that occurs between the client computing devices 115 and the network 45. However, as described below, the volume and type of data transmitted to and from the client computing devices 115 can be tailored to the requirements of the individual client computing devices 115 that are used to execute the client application 15.

In addition, according to a particular embodiment of the invention, the system 10 provides a locally-run version of the client application 15 for client computing devices 115 that have a certain system requirements (e.g., a particular operating system, such as Windows or Mac, or a particular Internet service provider), and a web-based version of the client application 15 for client computing devices 115 that have other types of system requirements (e.g., a particular operating system or particular network restrictions). In addition, in one embodiment, the system 10 may cease to stream one or more videos to the client computing device 115 if the client computing device 115 does not have sufficient operating specifications. In another embodiment, the client application 15 may notify the user of the client computing device 115 if the client computing device 115 does not have sufficient operating specifications for the client application 15 to process a request from the user.

According to one embodiment of the invention, one or more audio and/or video source servers 20 may be provided that stream video and audio content over the network 45, another network, and/or directly to the content delivery server 25. In addition, a content data storage device 40 is provided that stores at least a portion of the content that is distributed to the one or more client computing devices 115, according to one embodiment of the invention, and a subscriber data storage device 30 is provided that stores information about subscribers to the content delivery system 10.

Content Delivery Server

FIG. 2 shows a schematic diagram of a content delivery server 25 according to one embodiment of the invention. The content delivery server 25 includes a processor 60 that communicates with other elements within the content delivery server 25 via a system interface or bus 61. Also included in the content delivery server 25 is a display device/input device 64 for receiving and displaying data. This display device/input device 64 may be, for example, a keyboard or pointing device that is used in combination with a monitor. The content delivery server 25 further includes memory 66, which includes read only memory (ROM) 165 (e.g., masked ROM, programmable ROM (PROM), erasable programmable ROM (EPROM), electrically erasable programmable ROM (EEPROM)) and random access memory (RAM) 167 (e.g., dynamic RAM (DRAM) and static RAM (SRAM)). The server's ROM 65 is used to store a basic input/output system 26 (BIOS), containing the basic routines that help to transfer information between elements within the content delivery server 25.

In addition, the content delivery server 25 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules for various applications may be stored by the various storage devices and within RAM 67. Such program modules include an operating system 80 and one or more content modules 200 that are integrated into the content delivery server 25 to control certain aspects of the operation of the content delivery server 25 with the assistance of the processor 60 and an operating system 80.

Also located within the content delivery server 25 is a network interface 74, for interfacing and communicating with other elements of a computer network. It will be appreciated by one of ordinary skill in the art that one or more of the content delivery server 25 components may be located geographically remotely from other content delivery server 25 components. Furthermore, one or more of the components may be combined, and additional components performing functions described herein may be included in the content delivery server 25.

Client Computing Device

FIG. 3 shows a schematic diagram of a client computing device 115 in according with various embodiments of the invention. The client computing device 115 includes a processor 160 that communicates with other elements within the client computing device 115 via a system interface or bus 161. Also included in the client computing device 115 is a display device/input device 164 for receiving and displaying data and memory 166, which includes read only memory (ROM) 165 (e.g., masked ROM, programmable ROM (PROM), erasable programmable ROM (EPROM), electrically erasable programmable ROM (EEPROM)) and random access memory (RAM) 167 (e.g., dynamic RAM (DRAM) and static RAM (SRAM)). And, like the ROM 65 of the content delivery server 25, the client computing device's ROM 165 is used to store a basic input/output system 126 (BIOS), containing the basic routines that help to transfer information between elements within the client computing device 115.

In addition, the client computing device 115 includes at least one storage device 163, such as the type of storage devices 63 described above in relation to the content delivery server 25, and each of these storage devices 163 may be connected to the system bus 161 by an appropriate interface. The storage devices 163 and their associated computer-readable media provide nonvolatile storage for a personal computer. In addition, the client computing device 115 further includes a network interface 74 for interfacing and communicating with other elements of a computer network.

A number of program modules for various applications may be stored by the various storage devices and within RAM 167. For example, according to various embodiments in which the client application 15 is executed locally on the client computing device 115, such program modules include the operating system 180 and the various modules that are integrated into the client application 15 to control certain aspects of the operation of the client application 15 with the assistance of the processor 160 and an operating system 180.

Exemplary System Functionality

According to various embodiments of the invention, the client application 15 processes login information from a user, maintains subscription status of the user, manages the content received from the content delivery server 25, manages and stores user preferences, and manages the graphical user interfaces that are presented to the user and receives input from the user via the graphical user interfaces. Various exemplary graphical user interfaces that allow users to view content from the content server 25 and provide information to the content delivery system 10 are discussed below in relation to FIGS. 4 and 7-13.

Launching Client Application

According to one embodiment, the client application 15 can be stored on and executed from the client computing device 115 or executed through a link on a website by the client computing device 115. FIG. 5A illustrates an exemplary launch flow for launching a client application 15 that is stored on and is executed by the client computer device 115. Beginning at Step 201, the client computing device 115 is started and, at Step 203, the boot preferences of the client computing device 115 are checked to determine if the client application 15 is to launch at startup. The user can set this preference while in a prior session of the client application 15, which is discussed below in relation to FIGS. 14-17. If the client application 15 is to launch upon startup, the client application 15 launches upon startup of the client computing device 115, as shown in Step 205. If the client application 15 is not to launch at start up, the user can start the client application 15 at a later time (e.g., clicking on icon or inputting instructions to execute the client application 15), as shown in Step 207.

Upon launching at Step 209, the client application 15 determines whether the user has elected for automatic login or whether the user prefers to input the login information upon each launch of the client application 15. If the user prefers to input the login information upon each launch, the user then enters the user's login information into a login dialog window and the client application 15 receives the login information at Step 211. Regardless whether the user elects to login automatically or manually, the client application 15 then sends the login information for the user to the content delivery server 25, which verifies that the user's login information is valid, as shown in Step 213. This verification step, according to one embodiment, includes checking for the billing account status for the user. If the user needs to update the billing information for the user's subscription, the content delivery server 25 informs the client application 15 and the client application 15 presents a billing information dialog window that prompts the user to update the user's billing information and receives the updated billing information from the user as shown in Step 215. The updated billing information is then transmitted to the content delivery server 25 and verified in Step 213. In no valid billing information is transmitted to the content delivery server 25 or the user's login information is invalid, the process ends at Step 217.

If the user's billing information is up to date and the login information is valid, the client application 15 is launched in a default display mode (e.g., main display mode) as shown in Step 219, a system tray mode (e.g., an icon is displayed in the system tray) as shown in Step 220, the last display mode used by the user as shown in Step 221, or a display mode selected by the user to be used upon launching the client application 15 as shown in Step 222. Various exemplary display modes are discussed below in more detail in relation to FIGS. 4 and 7-13.

FIG. 5B illustrates an exemplary launch flow when the client application 15 is to be launched from a website. Beginning at Step 301, the user selects the link on the website to launch the client application 15. Upon launching, the client application 15 receives login information from the user as shown in Step 311, sends the login information to the content delivery server 25, and the content delivery server 25 checks the user's login information and billing account status as shown in Step 313 and described above in relation to FIG. 5A. If the billing information is not valid, the user is prompted to reenter the information at Step 315. If the user does not reenter valid information, the process ends at Step 317. If the user's billing information is up to date and the login information is valid, the client application 15 is launched in a default display mode (e.g., main display mode) as shown in Step 319, a system tray mode (e.g., an icon is displayed in the system tray) as shown in Step 320, the last display mode used by the user as shown in Step 321, or a display mode selected by the user to be used upon launching the client application 15 as shown in Step 322.

Receiving and Managing Content

According to various embodiments, upon launching and logging into the client application 15, the content delivery server 25 delivers content to the client application 15 over a network, such as, for example, a LAN or the Internet. For example, content received from the content delivery server 25 includes, but is not limited to, live streaming video and audio content, on-demand video and audio content, summary text related to video or audio content (e.g., a system producer's blog for a particular video feed), comments from other users related to video or audio content, a program schedule listing for a particular television channel, a schedule listing of live streaming video and audio feeds for a particular time period (e.g., next 24 hours, remainder of the day, week, or month), a listing of on-demand video and audio content that has been watched by the most users, a listing of on-demand video and audio content that has been suggested for viewing by a system producer, external links (e.g., hyperlinks) to websites and other information (e.g., documents or other on-demand video and/or audio content) relevant to the currently streaming or playing video or audio content, text announcing breaking news, and text announcing upcoming live streaming video content. These examples of content and other types of content are described below in relation to FIGS. 4 and 7-18 illustrating various exemplary graphical user interfaces that may display the content to the user via the client computing device 115.

Displaying Multiple Live Video Feeds

The content delivery server 25, according various embodiments, is configured to stream a plurality of live video feeds to the client application 15 over a network substantially concurrently, and the client application 15 is configured to display one or more of the plurality of live video feeds to the user substantially concurrently. In one embodiment, the content delivery server 25 streams at least one of the video feeds in high resolution and at least one of the video feeds in low resolution, which, in one embodiment, can save bandwidth over the network.

In a particular embodiment of the invention, the client application 15 is configured to display in a main display dialog window, such as the main display dialog window 400 shown in FIG. 4, a high resolution version of one of the live video feeds in a "primary" video pane 401 and low resolution versions of the additional live video feeds in "preview" video panes 403 of the main display dialog window 400 substantially concurrently. According to one embodiment, this feature allows the user to preview additional videos in the preview video panes 403 while a video is playing in the primary video pane 401. The content delivery server 25 according to one embodiment selects the live video feed to be displayed in the primary video pane 401 upon startup of the client application 15 or upon resuming the client application 15 from system tray mode, which is discussed below.

In one embodiment, the additional live video feeds displayed in the preview video panes 403 are different from each other and from the video feed being displayed in the primary video pane 401. The live video feeds may be streamed from independent sources to the content delivery server 25 (e.g., by producers), or the live video feeds may be streamed from a common source. In addition, the various live video feeds delivered to the client application 15 from the content delivery server 25 may be selected at the content delivery server 25, or one or more of the live video feeds may be selected at the client application 15 by the user. In one embodiment, if a live video feed is selected by the user through the client application 15, the client application 15 transmits the request for the live video feed to the content delivery server 25, which locates a source for the requested live video feed and streams it to the client application 15. The ability of the content delivery server 25 to stream the requested live video feed may depend on whether the content delivery server has obtained a right to distribute the live video feed to the client application 15, according to one embodiment. For example, if the content delivery server 25 does not have the right to distribute the live video feed to the client application 15, the content delivery server 25 notifies the user through the client application 15 (e.g., via a dialog window) or notifies the user directly (e.g., via email).

In addition, according to one embodiment, the audio feeds associated with the video feeds streaming into the preview video panes 403 are muted. However, according to another embodiment, the user can toggle among the audio feed associated with the video feed streaming into the primary video pane 401 and the audio feeds associated with the video feeds streaming into each of the preview video panes 403.

Furthermore, according to a particular embodiment, the client application 15 is configured to receive a selection from the user as to which live video feed is to be displayed in the primary video pane 401. For example, in one embodiment, the user may select (e.g., click on) one of the video feeds streaming into one of the preview video panes 403 to instruct the client application 15 to display the selected video feed in the primary video pane 401. According to one embodiment, in response to the instruction, the client application 15 sends a request to the content delivery server 25 to stream the high resolution version of the selected video to the client application 15. In response, the content delivery server 25 streams the high resolution version of the selected video to the client application 15, and, in one embodiment, stops streaming the high resolution version of the video feed playing in the primary video pane 401 before the selection was made by the user. Upon receiving the high resolution version of the selected video, the client application 15 streams the high resolution version of the currently selected video in the primary video pane 401 and streams the low resolution version of the video that was previously playing in the primary video pane 401 in one of the preview video panes 403. In addition, the preview video pane 403 that previously displayed the low resolution version of the video that is currently being played in the primary video pane 401 includes an indicator that the video is playing in the primary video pane 401, as indicated by preview video pane 403a, according to one embodiment of the invention.

According to a particular embodiment, the content delivery server 25 maintains links with sources that provide the low resolution version and the high resolution version of each live video feed. In one embodiment, independent sources may provide each version of a particular video feed. For example, website A may provide a low resolution version of a video feed and website B may provide the high resolution version of the video feed. In addition, in one embodiment, the content delivery server 25 may maintain links with sources that provide video feeds of various camera angles showing the same event, such as for a sports event.

As shown in FIG. 6, according to a particular embodiment, the content delivery server 25 receives the low resolution and high resolution video streams from video source servers 20*a*-20*f* and delivers one or more of the available low resolution video feeds to the client application 15 and switches among which high resolution video feeds are to be delivered to the client application 15 depending on the user's selection, as described above. In addition, according to one embodiment, the user can select to view video feeds that belong to a particular genre or group. The client application 15 according to one embodiment sends this selection to the content delivery server 25, and the content delivery server 25 limits its delivery of available low resolution video feeds to those video feeds that belong to the selected genre or group.

The terms "high resolution" and "low resolution" as used herein refer to a relative, or subjective, perception of the number of lines or pixels displayed for a particular video. For example, streaming a video in high resolution, according to various embodiments of the invention, may refer to a video that is streamed with a high number of bits per pixel, a high number of bits per picture, or a high number of bits per second as compared to videos streamed in low resolution. Thus, because these terms are used in a relative sense, increasing the number of bits per pixel or bits per second of a video may not necessarily achieve a higher resolution in certain embodiments. In addition, in one embodiment, the client application 15 is configured for applying subjective resolution enhancement techniques to a lower resolution video to allow the video to be displayed with a higher resolution.

For example, in one embodiment, high resolution video is streamed at a data rate of between about 300 kilobits per second (kbps) and about 700 kbps, and the low resolution video is streamed at a data rate of between about 60 kbps and about 80 kbps. In a particular embodiment, the high resolution video is streamed at about 350 kbps, and the low resolution video is streamed at about 60 kbps. However, it should be understood that these ranges of data rates may vary depending on the network connectivity between the client computing device 115 and the content delivery server 25.

As shown in FIG. 4, according to one embodiment, the primary video pane 401 may be larger than the one or more preview video panes 403, and, in one embodiment, the primary video pane 401 may be centered in the main display dialog window 400 while the preview video panes 403 are positioned adjacent to the primary video pane 401 within the main display dialog window 400.

According to various embodiments of the invention, the client application 15 is configured to provide an audio component associated with a video component of the video feed. The client application 15 and the content delivery server 25, in one embodiment, ensure that the audio component is synchronized with the video component. For example, the content delivery server 25 encodes a time stamp for each video component and audio component that it streams to the client application 15 (e.g., during compression of the video feeds). The time stamps are continuously synchronized with a "house" clock on or in communication with the content delivery server 25 to avoid any drift and to ensure that all time stamps come from the same source. Upon receiving the audio and video components, the client application 15 compares the time stamps of each and controls the speed at which they are streamed to the user to ensure the time stamps are synchronized during play. In addition, in one embodiment, if the client application 15 is displaying video feeds showing various camera angles of the same event in the various display panes 401, 403, the client application 15 is configured to maintain the synchronization of the video feeds by comparing the time stamps of each video feed and controlling the speed at which they are played to the user.

For example, in one embodiment, live video feeds of a sporting event are captured by a plurality of cameras, and the live video fees are streamed to the client application 15 and displayed substantially concurrently by the client application 15 to the user. In a particular embodiment, each camera may capture footage of a particular player or group of players (e.g., in a golf game or tennis game), and in another embodiment, each camera may capture footage of the same event being filmed by the other cameras from a different angle than the other cameras (e.g., in a football or basketball game).

Furthermore, according to another embodiment, the client application 15 is configured to play an audio feed from a source that is independent of the video feed upon selection of an independent audio feed by the user. For example, the user may select an alternative audio feed to be played when there is not an audio component available for or associated with the video feed or the user prefers to hear another audio feed instead of the audio component associated with the video feed. As described above, the client application 15 is configured to maintain synchronization of the audio feed selected and the video feed.

Play Controls

According to various embodiments of the invention, the client application 15 allows the user to control the play of a live video feed, such as pausing, re-starting, stopping, rewinding, fast-forwarding, "jumping to live", and recording the live video feed. According to one embodiment, play control functionality is provided by interfacing with the play controls provided by one or more media players that reside on the client computing device 115 (e.g., Windows Media Player™, QuickTime™, RealPlayer™, and Adobe Flash Player™). For example, according to one embodiment, the client application 15 displays a "play video" button 410, which if selected by the user instructs the client application to play the video; a "stop video" button 412, which if selected instructs the client application to stop play of the video; a "pause video" button, which if selected instructs the client application to pause play of the video; a "fast forward" button 416, which if selected instructs the client application to advance the video forward a certain amount of time; a "rewind" button 418, which if selected instructs the client application 15 to the move the video backward a certain amount of time; and a "jump to live" button 420, which if selected advances the video to the end of a buffer file. Each function is discussed in more detail below in reference to selection of an exemplary button that instructs the client application 15 to perform the desired function.

For example, according to one embodiment, selection of the "pause video" button instructs the system to pause the video feed and its associated audio feed, retain the video frame position in the pane 401, display the current frame position 422 of the video in a "live progress meter" 424 (referred to sometimes as a "play head"), continue to fill the buffer file on the client computing device 115 with live video, and update the "live progress" meter 424 to illustrate the video being streamed to the buffer file during the pause.

According to various embodiments, streaming video and/or audio content may be stored in a temporary storage (e.g., memory 166 that is temporary or a storage device 163 that provides temporary storage of data) on the client computing device 115. For example, the buffer file, according to one embodiment, is a circular file having a certain size that stores the video and/or audio being streamed to the client computing device 115 until it reaches the end of the file, and then starts over at the beginning of the file by rewriting over previously stored video and audio with newly received video and audio. Thus, according to one embodiment, if the video has been paused for less than the maximum buffer time (e.g., the size of the file corresponds to a certain amount of time), then the "play head" 422 of the live progress meter 424 will remain in the same position while the live progress meter 424 continues to grow as the video and audio are being streamed in the buffer file. However, if the video has been paused for longer than the maximum buffer time, the client application 15, according to one embodiment, switches out of paused mode and switches into stop mode, which is discussed below. In another alternative embodiment, the client application 15 recognizes when the buffer file is close to being full and alerts the user that the buffer file is almost full. And, in yet another embodiment, the client application 15 switches to play mode when the buffer file is full and begins playing the video from the live position of the video. In one embodiment, the client application 15 discards the saved buffer file after an extended pause.

In one embodiment, selection of the stop button 412 instructs the client application 15 to detune, or stop playing, the video and audio stream and not store the live video in the buffer file while stopped. In a further embodiment, selection of the stop button further instructs the client application 15 to play a default interstitial animation until the user selects another video.

According to one embodiment, clicking on the fast forward button 416 once instructs the client application 15 to jump the video forward in time by a certain amount of time (e.g., one second, five seconds, or a minute) or to the end of the content stored in the buffer file, whichever is shorter. If the fast forward button 416 is clicked on and held, the client application 15 advances through the buffer file more quickly than if playing the video at normal play speed (e.g., twice as fast or three times as fast as normal play speed) with smooth playback. Upon releasing the fast forward button 416, the client application 15 plays the video beginning at the current frame position in the buffer file when the fast forward button 416 is released. According to one embodiment, the fast forward option is available for live video feeds when the video is being viewed in a buffered state (e.g., after a pause or rewind), and in one embodiment, audio is not played while the video is being fast forwarded.

According to one embodiment, clicking on the rewind button 418 once instructs the client application 15 to jump the video backward in time by a certain amount of time (e.g., one second, five seconds, or a minute) or to the beginning of the buffer file, whichever is shorter. If the rewind button 418 is clicked on and held, the client application 15 plays the video backwards more quickly than the normal play speed (e.g., twice as fast or three times as fast as the normal play speed) with smooth playback. Upon releasing the rewind button 418, the client application 15 plays the video beginning at the current frame position in the buffer file when the rewind button 418 is released. According to one embodiment, the rewind option is available to the extent of the video stored in the buffer file, and in one embodiment, audio is not played while the video is being rewound.

According to one embodiment, selecting the "jump to live" button 420 instructs the client application 15 to advance the video to the top of the current, live stream (e.g., end of the buffer file). In a further embodiment, the client application 15 moves the play head 422 to the far right end of the live stream progress meter 424 in response to selection of the jump to live button 420.

According to one embodiment, the client application 15 may further provide the user with the ability to pause, fast forward, and rewind all of the video feeds displayed in the main display dialog window 400 (e.g., the video feeds playing in the primary video pane 401 and the preview video panes 403) while maintaining the synchronization of the various video feeds. For example, in an embodiment in which the client application 15 is displaying a first camera angle of an event in the primary video pane 401 and additional camera angles of the same event in the preview video panes 403 and the videos are synchronized with each other, the user can pause, fast forward, and rewind all of the videos together, which, in one embodiment, provides an experience to the user similar to that of a television producer.

In addition, the client application 15 according to various embodiments allows the user to record live video streams. In one embodiment, the user can select a record icon to instruct the client application 15 to save the live video feed to nonvolatile storage in the client computing device 115. Nonvolatile storage includes memory 166 and/or storage devices 163 on the client computing device 115 that do not lose data when power to the client computing device 115 is turned off. If the video has not already started streaming, the client application 15 according to one embodiment is configured to identify an "event start" tag encoded in the video stream, which indicates the beginning of the video stream, and in response to identifying the event start tag, begin storing the streaming video to memory in the client computing device 115. The client application 15 is further configured to identify an "event end" tag that is encoded in the video stream to indicate the end of the live video stream, and in response to identifying the event end tag, stop storing the video stream. If the video has already started streaming, the client application 15 according to one embodiment is configured to search in the buffer file for the "event start" tag, and upon locating the event start tag, copy the video stream in the buffer file beginning at the event start tag to memory in the client computing device 115. After the client application 15 copies the video stream stored in the buffer file, the client application 15 stores the remainder of the video into the memory of the client computing device 115 as it streams into the client computing device 115. The client application 15 stops storing the video stream upon receiving the event end tag for the video stream. Thus, according to one embodiment, the client application 15 records the streaming video file based on the actual beginning and the end of the file, and not based on the time window in which the video file is scheduled to be streamed. In addition, according to one embodiment, the user can associate the recorded video stream with a particular genre and/or user-specific group (e.g., "My Group" group).

According to various embodiments of the invention, the client application 15 is further configured for determining whether the user has rights to record the video content before storing the content to the client computing device 115. In particular, in one embodiment, prior to compressing the video content, the content delivery server 25 (or the source of the video content) embeds metadata into the video content that indicates whether users have the right to store the video locally. After decompressing and decoding the video content, the client application 15 reads the metadata to determine whether the user has the right to store the video locally.

Furthermore, the client application 15 according to one embodiment allows the user to mute the audio component of the video feed, view and adjust the volume level of the audio component, and adjust the display mode of the client application (e.g., displaying in a large window or pane or displaying in a smaller window or pane, or displaying with or without additional content, such as related text and links, which are described in more detail below). In one embodiment, the client application 15 displays a mute button 428 that can be toggled by the user to mute and un-mute the audio playing with the video feed. In one embodiment, when the mute button 428 is toggled to mute the audio component, the client application 15 mutes the audio component and turns off indicator lights for a volume control indicator 430. Similarly, when the mute button 428 is toggled to un-mute the audio component, the client application 15 un-mutes the audio component, returns the audio component to the previous volume level, and turn on the indicator lights for the volume control indicator 430.

Furthermore, the volume control indicator 430 according to one embodiment provides a plurality of volume levels 431 that the user can select to set the volume of the audio component (e.g., six bars, twelve bars). For example, selecting a bar 431 toward the right side of the indicator 430 increases the volume and selecting a bar 431 toward the left side of the indicator 430 decreases the volume. In addition, the volume may be controlled by selecting a "volume increase" button 432 to increase the volume in certain increments and a "volume decrease" button 434 to decrease the volume in certain increments.

According to certain embodiments, the client application 15 is further configured to display pre-recorded, on-demand audio and video content that is stored in content datastore 40 or retrieved by the content delivery server 25 from other sources. The client application 15 is further configured to provide similar display controls when the client application 15 is displaying on-demand video (VOD). For example, according to one embodiment, when the user selects to stop play of an on-demand video, the client application 15 stops playing the video and plays a default interstitial animation until the user selects another video. However, because the on-demand video is pre-recorded and is not necessarily limited to the size of the buffer file on the client computing device 115, the client application 15 may be configured to resume play from the point at which the video is stopped upon selection of the play button 410 by the user, according to one embodiment.

As mentioned above, the content delivery server 25 is further configured, according to various embodiments, to deliver content to the client application 15 in addition to live streaming and on-demand video and audio content. In one embodiment, the client application 15 is configured to receive the additional content from the content delivery server 25 and present it to the user in an appropriate pane within the main display dialog window 400 or within another dialog window as discussed below in relation to FIG. 13.

Related Content

For example, in various embodiments, certain portions of the content (e.g., text summarizing or commenting on a particular video feed, links to external websites, or links to other on-demand audio or video feeds) are specifically related to the video feed that is playing in the primary video pane of the main display dialog window 400. The client application 15 in a particular embodiment is configured to present the content related to the video feed that is playing in the primary video pane 401 in an appropriate "related content" pane(s) 440 and maintain the association of the particular video feed and the content related to the particular video feed during display mode changes. Furthermore, in another embodiment, the client application 15 is configured to update the content displayed in the "related content" pane(s) 440 with content specifically related to the video feed selected to be displayed in the primary video pane 401. Thus, if the user selects another video feed to be displayed in the primary video pane 401, the client application 15, in addition to changing the video feed that is displayed in the primary video pane 401, changes the related content that is displayed in the related content pane(s) 440 to correspond to the newly selected video feed. In one embodiment, this feature of the client application 15 provides the user with a "one-stop-shop" for information related to the selected video feed.

As mentioned above, according to one embodiment, the related content may include text summarizing or commenting on a particular video feed, links to external websites related to the particular video feed, and/or links to other on-demand video or audio related to the particular video feed. The text summarizing or commenting on the video feed may be input by a system administrator (e.g., a producer) at the content delivery server 25. In this embodiment, the text is similar to a blog. In addition, the text may be input by another user through a client application 15, uploaded to the content delivery server 25, and pushed out to other client application 15. Similarly, the links to external websites or to other on-demand content may be input at the content delivery server 25 or through another user's client application 15.

According to one embodiment, if the user selects to view a website that is listed as related to the video feed, the client application 15 is configured to instruct the client computing device 115 to open the website in its default Internet browser application, which, according to one embodiment, respects non-Internet Explorer preferences. And, according to one embodiment, the window for the default browser is displayed in front of and offset from the main display dialog window 400 of the client application 15. According to an alternative embodiment, the window for the default browser is displayed behind the main display dialog window 400 of the client application 15, such as when the client application 15 is in a "pin on top" display mode, which is discussed in more detail below in relation to FIG. 13.

If the user selects to view on-demand video feeds that are listed as related to the video playing in the primary video pane 401, the client application 15, according to one embodiment, is configured to stop streaming the high resolution version of the video feed currently playing in the primary video pane 401, begin streaming the low resolution version of the video feed to a preview video pane 403, and play the related on-demand video in the primary video pane 401.

Schedule of Events

Furthermore, the content delivery server 25 according to one embodiment of the invention is configured to distribute to the one or more client applications 15 a list of all live video feeds that are scheduled to be streamed during a particular time period (e.g., in the next twelve hours, next twenty-four hours, that day, or that week) and/or on-demand videos that are scheduled to be available for downloading during the particular time period. The client application 15 is configured to receive the list and display it in the schedule pane(s) 445 to the user. According to one embodiment of the invention, the client application 15 is configured to allow the user to request a reminder for a particular event listed (e.g., by clicking on the event or on an icon associated with the event) and remind the user of the particular event before the particular event begins (e.g., five minutes prior to the scheduled start time) and/or when the particular event has started.

In addition to being able to schedule a reminder for a particular event, the client application 15 according to one embodiment is configured to receive an instruction from the user to record the upcoming live video feed. For example, the client application 15 may display a record icon with each event listed, and if the icon is selected by the user, the client application 15 is instructed to record the live video feed when it begins streaming.

According to various embodiments, the client application 15 is further configured for receiving a request from the user to record video content associated with a particular category or genre (e.g., professional baseball, college football, celebrity news, or national politics) that may become available in the future. For example, in one embodiment, the video content is embedded with metadata that indicates a particular category or subject matter to which the video pertains. In response to receiving the request from the user to record video content associated with the particular category or genre, the client application 15 is configured for sending a request to the content delivery server 25 to stream any videos that become available and that are within the particular category or genre. The content delivery server 25 reads the metadata associated with videos to determine if the video is within the requested category or genre, and, if the video is within the requested category or genre, streams the identified video to the client application 15. The client application 15 then records the video to the client computing device's memory. In an alternative embodiment, the content delivery server 25 may prompt the user through the client application 15 (e.g., via a display window) or directly (e.g., via email, phone, or facsimile) that a video is or will be available for streaming and request that the user confirm or provide instructions to the client application 15 to record the video.

In yet another embodiment, the client application 15 is configured for tracking the user's selection of video content over a particular time period (e.g., a week, a month, a year, 2 years, or 5 years) and identifying one or more categories of videos in which the user is likely to have interest based on the user's previous selections. Upon identifying one or more categories in which the user is likely to have interest, the client application 15 is configured for recording new videos within the identified one or more categories that become available to the user.

Content Updates

To ensure that the content displayed to the user is up-to-date, the client application 15 according to one embodiment is configured to poll the content delivery server 25 for content updates on a periodic basis (e.g., every 5 minutes, every 30 minutes, every hour, etc.). Updated content received from the content delivery server 25 may include news stories, new video feeds, schedule changes, advertiser showcase content, and sponsored data. In addition, client application 15 may be configured to poll the content delivery server 25 more frequently while the client application 15 is actively running and less frequently when the client application 15 is running in system tray mode, which is discussed in more detail. Furthermore, the content delivery server 25 according to one embodiment is configured to push to the one or more client applications 15 alerts, such as breaking news alerts or new live video feeds, without having to be polled for updates by the one or more client applications 15. In one embodiment, the delivery of alerts occurs in a relatively short time period compared to the frequency of polling (e.g., less than 5 seconds). In one embodiment, the breaking news alerts are displayed in a "just in" pane 447 in the main display dialog window 400.

Search Function

According to various embodiments of the invention, the client application 15 comprises a search engine that is configured for receiving a search term(s) from a user and searching for video and audio content stored on the client computing device 115 or on the content delivery server 25 related to the search terms. An exemplary search dialog window is shown in FIG. 7.

According to one embodiment of the invention, the client application 15 provides a text box 450 for receiving the search term to be searched and a search button 451 adjacent to the text box for instructing the client application 15 to search for the particular term in the main display dialog window 400. In addition, in one embodiment, the client application 15 includes a dropdown box 452 that includes a list of genres or groups of content, and the user can click on a particular genre or group, which instructs the client application 15 to search for content related to that selected genre or group.

In response to a request to conduct a search for content, the client application 15 according to one embodiment is configured to search the client computing device 115 and request a listing of content related to the search terms from the content delivery server 25. If the content delivery server 25 includes content related to the search terms, the content delivery server 25 transmits the listing to the client application 15, which receives the listing and displays the search results to the user. In a particular embodiment, the search engine can be configured to return only live video and audio feed content or, in an alternative embodiment, return only on-demand video or audio content. In yet another embodiment, the search engine can be configured to return both live video and audio feed and on demand video and audio content.

FIG. 7 illustrates an exemplary search results dialog window 500 according to one embodiment of the invention. The search results dialog window 500 includes a search pane 501 that displays the search results in a tabular format, a back button 503 that instructs the client application 15 to return to the display mode displayed prior to requesting the search, and text 505 showing the search terms entered and the number of search results. In a further embodiment (not shown), the search results dialog window may also display an option to refine the search results. For example, the search dialog window may allow the user to refine the search results by selecting a particular "section" (or genre of content) and displaying only the search results grouped within the selected section.

According to one embodiment, the table listing the search results includes a "headline" column for displaying a play button, a title for the video or audio feed, and the length of time of the video; a "time" column for displaying the time and/or date that the video feed was uploaded to the content delivery server 25; a "section" column for displaying a genre for the video or audio feed (e.g., World, Entertainment, Sports, U.S., Law, Politics, Business), and a "most watched" column for displaying an indication of how many users have watched the video feed. The client application 15 according to one embodiment is configured to display the results in chronological order based on the time in the time column, listing the most recently uploaded video first. However, the client application 15 according to one embodiment allows the user to sort the search results by selecting a column heading. For example, the user can click on the column heading for "most watched" to instruct the client application 15 to list the search results in order of the most watched content to the least watched content or click on the "headline" column heading to sort the search results in alphabetical order. To sort in reverse order, the user can click on the column heading a second time, for example. And, in a further embodiment, the client application 15 is configured to sort the search results primarily according to the column heading selected and secondly by the time the content was uploaded to the content delivery server 25.

In addition, according to one embodiment, the client application 15 further provides a vertical scroll bar 507 and/or "previous" 508 and "next" 509 buttons in or adjacent to the search pane 501 to allow the user to scroll through the search results when the search engine returns more results than will fit within the search pane.

In addition, according to various embodiments, the search results dialog window 500 further includes a video pane 510. The client application 15 is configured to continue playing the video that was playing in the primary video pane of the main display dialog window 400 just before the search was requested in the video pane 510 of the search dialog window 500, which according to one embodiment, allows the user to continue watching the video while reviewing search results. In addition, according to one embodiment, the client application 15 is configured receive a selection of video content listed in the search pane 501 and play the selected video feed in the video pane 510 of the search dialog window 500. This feature, according to one embodiment, allows the user to preview the selected content while reviewing the search results. The user can select a particular video feed to preview by selecting the row on which the video feed is listed, the title of the video feed, or the play button of the video feed that the user wants to preview. In a further embodiment, the video pane 510 in the search dialog window 500 provides the user with play options described above to control play of the video, such as starting, pausing, stopping, rewinding, and fast forwarding play of the video.

According to one embodiment, the client application 15 further provides a "main" button 512 which the user can select to instruct the client application 15 to display the particular video feed being previewed in the video pane 510 of the search dialog window 500 in the primary video pane 401 of the main display dialog window 400. In a further embodiment, the client application 15 is configured to display content related to the selected video in the appropriate "related content" pane 440 adjacent to the primary video pane 401, if any related content has been provided by the content delivery server 25. In addition, any related content may be displayed in a related content pane 514 in the search dialog window 500.

According to yet another embodiment (not shown), the client application 15 is configured to display a search pane in the main dialog window 400 in place of the preview video panes. This ability, according to one embodiment, allows the user to continue watching the video that is playing in the primary video pane 401 (prior to submitting the search request) and review the search results. To preview one of the videos listed in the search pane, the user selects the video to be previewed, and the client application 15 plays the video in the primary video pane 401. This display option provides the user with the ability to preview search results in the primary video pane 401 while being able to view the additional content provided in the main display dialog window 400.

Browsing Content

The client application 15 according to various embodiments is configured to display a listing of video and audio content that is available for streaming and/or stored on the client computing device 115 or on the content delivery server 25 and is available for selection by the user. In one embodiment, the client application 15 is configured to present a listing of the available content and allow the user to scroll through and preview the content. Exemplary browse dialog windows are discussed below in relation to FIGS. 8 and 9.

The client application 15 according to a particular embodiment is configured to display the listing of available content in a browse pane that is part of the main display dialog window 400 or in a separate browse dialog window. For example, FIG. 8 illustrates an exemplary browse dialog window 600 according to one embodiment of the invention. The browse dialog window 600 displays available content in a tabular format, such as described above for search results, and provides a video pane 610 for previewing content listed in the table. The video pane 610 is positioned adjacent to the tabular listing 601 of content as part of the browse dialog window 600. In the embodiment shown in FIG. 8, the video pane 610 includes play controls similar to those described above.

FIG. 9 illustrates a collapsed browse dialog pane 620 according to one embodiment, which displays the available content in the browse dialog pane 620 in lieu of the preview video panes 403 displayed in the main display mode.

According to one embodiment of the invention, the client application 15 is further configured to present the user with a browsable list of live and/or on-demand video content. In one embodiment, the list is compiled by the system producer as suggested viewing material. For example, as shown in the exemplary main display dialog window 400 shown in FIG. 10, the client application 15 displays a preview video ribbon 701 that displays one or more available live video feeds and/or still panes 703 associated with on-demand videos. Each pane 703 associated with an on-demand video displays an exemplary picture from the video, a title for the video, and the length of the video, according to one embodiment. In addition, in a particular embodiment, the client application 15 is configured to display the date and time that the on-demand video was uploaded to the content delivery server 25 when the user positions a cursor or mouse pointer over the particular on-demand video. Upon selecting a particular video, the client application 15 plays the video in the primary video pane 401 of the main dialog window 400. The preview video ribbon 701, according to one embodiment, further includes arrows for scrolling through the panes 703. In addition, in one embodiment, the client application 15 is configured to present the user with a browsable list of available on-demand video (without available live videos) in the panes 703.

FIG. 11 illustrates an expanded display dialog window 710 according to one embodiment of the invention. In the expanded display dialog window 710, the panes 703 are displayed in one or more ribbons 701, which may be scrollable depending on the number of panes 703 to be displayed, and a video pane 705 that is smaller than the primary video pane 401 is displayed adjacent the panes 703. The user can select a particular pane 703 from the list of panes 703 to preview, and the client application 15 displays the video associated with the selected frame in the video pane 705. According to one embodiment, the video pane 705 includes play controls similar to those described above in relation to the main display dialog window 400.

According to various embodiments, the client application 15 is further configured for displaying a list of video and/or audio content (e.g., live and/or on-demand) that are most watched or accessed by users of the system 10. In particular, in one embodiment, the content delivery server 25 receives selections of video and/or audio content from the users of the system 10 from the user's client computing devices 115. The content delivery server 25 maintains a record of the content selected by the users and determines which content is requested most often by the users. Upon identifying the content that is requested most often by the users, the content delivery server 25 generates a list of the identified content and transmits the list to the client applications 15 running on each of the client computing devices 115 for display to the users of the client computing devices 115.

In addition, according to one embodiment, the client application 15 is configured for displaying a list of video and/or audio content (e.g., live and/or on-demand) that the user is likely to prefer based on the user's past choices of content. In particular, in one embodiment, the client application 15 maintains a record of the content selected by the user and the one or more categories or genres to which the selected content belongs. The client application 15 determines the one or more categories or genres that the user tends to prefer based on the record of the content selected by the user and the one or more categories to which the content belongs, and generates a list of additional content within the identified category(s) that may be of interest to the user. The list of additional content is then displayed to the user.

According to various embodiments of the invention, the user may request to browse through additional content not currently shown within the user interface window, such as when all of the available content cannot fit within the panes of the user interface window. In particular, in one embodiment, the client application 15 is configured for receiving a request from the user to browse through additional video and/or audio content (e.g., live or on-demand) available for viewing but not currently being displayed. In response to receiving the request, the client application 15 generates a request for the content delivery server 25 to stream (or send a list of) additional available video and/or audio content to the client computing device 115. In response to receiving one or more streams of additional available content, the client application 15 decodes and displays (or plays) the content within the user interface window. In a particular embodiment, the client application 15 displays the additional live video(s) in a preview pane, and the content delivery server 25 ceases streaming of one of the videos previously playing in the preview pane. In an alternative embodiment, the client application 15 displays the additional live video(s) in a new preview pane within the user interface window.

In yet another embodiment, similar to the embodiment shown in FIG. 11, the client application 15 is configured for displaying within the user interface window at least one scrollable ribbon that includes one or more panes for displaying available video. The scrollable ribbon allows the user to scroll through (e.g., by selecting "advance right"/"advance left" or "advance up"/"advance down" buttons on the ribbon) the available videos displayed in the scrollable ribbon. For example, the locations of the panes are moved through the scrollable ribbon in response to the user scrolling through the ribbon such that at least one new pane displaying a video that was not displayed when the request was received by the client application 15 is displayed.

In another embodiment, the client application 15 is configured for displaying within the user interface window at least two scrollable ribbons, and each scrollable ribbon includes at least one pane for displaying available video content. In addition, each scrollable ribbon is collapsible and expandable, such that the client application 15 displays the videos associated with an expanded scrollable ribbon in panes within the expanded scrollable ribbon and does not display videos associated with a collapsed scrollable ribbon. In one embodiment, each of the scrollable ribbons are associated with a particular category of videos to be displayed within the scrollable ribbon.

Display Modes

The client application 15 according to various embodiments is configured to adjust the manner in which content is displayed to the user via one or more display modes. For example, the user can view content delivered to the client application 15 in a default or "main" display mode. The main display mode displays the main display dialog window, such as the main display dialog window 400 described above in relation to FIG. 4, which includes a primary video pane 401 and one or more preview video panes 403 along with various other content delivered to the client application 15 from the content delivery server 25. In addition, the client application 15 is configured to display content in a "full screen" mode, which displays only the video streaming into the primary video pane in the main display dialog window and play controls in a "full screen" window that is the size of the display screen of the client computing device 115. Furthermore, the client application 15 is configured to display content in a "video only" mode, which displays only the video streaming into the primary video pane in the main display dialog window and video controls in a "video only" display dialog window, such as the video only display dialog window shown in FIG. 12. The "video only" display dialog window is smaller than the full size of the display screen according to one embodiment.

According to various embodiments of the invention, the client application 15 is configured to display content in a "shrink expanded" or a "shrink collapsed" mode. In the "shrink expanded" mode, the video playing in the primary video pane 401 of the main display dialog window 400 is displayed in a smaller video pane, and at least a portion of the text and other content displayed on the main display dialog window is displayed in a tiered format adjacent to the smaller video pane. FIG. 13 illustrates an exemplary graphical user interface of the shrink expanded window according to one embodiment. The content is grouped by the same headings on in the main display dialog window 400, according to one embodiment. For example, content related to the video playing in the pane 801 is listed under the "related" heading, and content listing the top on-demand videos is listed under the "top stories" heading. In addition, according to one embodiment, the client application 15 can be configured to expand and collapse the information listed under each heading. For example, the user can click on a heading to view the content related to the heading and click on the heading again to collapse or hide the content listed under the heading.

In the "shrink collapsed" mode, the video playing in the primary video pane of the main display dialog window is displayed in a smaller video pane of a "shrink collapsed" window that includes play controls but does not display the text or additional content displayed in the main dialog window.

In addition, according to one embodiment, when the client application 15 is in "shrink expanded" or "shrink collapsed" mode, the volume control indicator may display less indicator bars. In a particular embodiment, each indicator bar displayed in the shrink expanded dialog window 800 or shrink collapsed display dialog window represents two indicator bars that are displayed in the main or full screen display dialog window. In addition, when the client application 15 is switching between display modes, such as between the shrink expanded mode and the main display mode, the client application 15 adjusts the volume control indicator to display the corresponding volume level. For example, if the video is being displayed in the main display dialog window and the volume indicator displays 5 of 12 bars, the client application 15 displays 3 of 6 bars on the volume indicator for the shrink expanded display dialog window.

According to various embodiments of the invention, the client application 15 is configured to maintain video and audio continuity when transitioning between different modes. For example, when changing from the main display mode to the shrink expanded mode, the audio associated with the video streaming in the primary video pane of the main display dialog window continues playing, and the video continues playing in the shrink expanded display dialog window within a certain amount of time after the selection is made by the user (e.g., no more than a two second delay). Furthermore, the client application 15 is configured to maintain video and audio synchronization during the mode transition. Thus, according to one embodiment, the client application 15 may advance the video to the appropriate frame that is in synch with the audio feed that continued to play during the transition.

Alert Function

In one embodiment, the client application 15 is configured to run in a main display mode, such as those discussed above, and a system tray mode. In the main display mode, the client application 15 operates according to one or more of the various embodiments described above (e.g., displaying multiple video feeds and other content to the user). In the system tray mode, the client application 15 receives updated content from the content delivery server 25 but does not actively display the content to the user.

Figure 16:
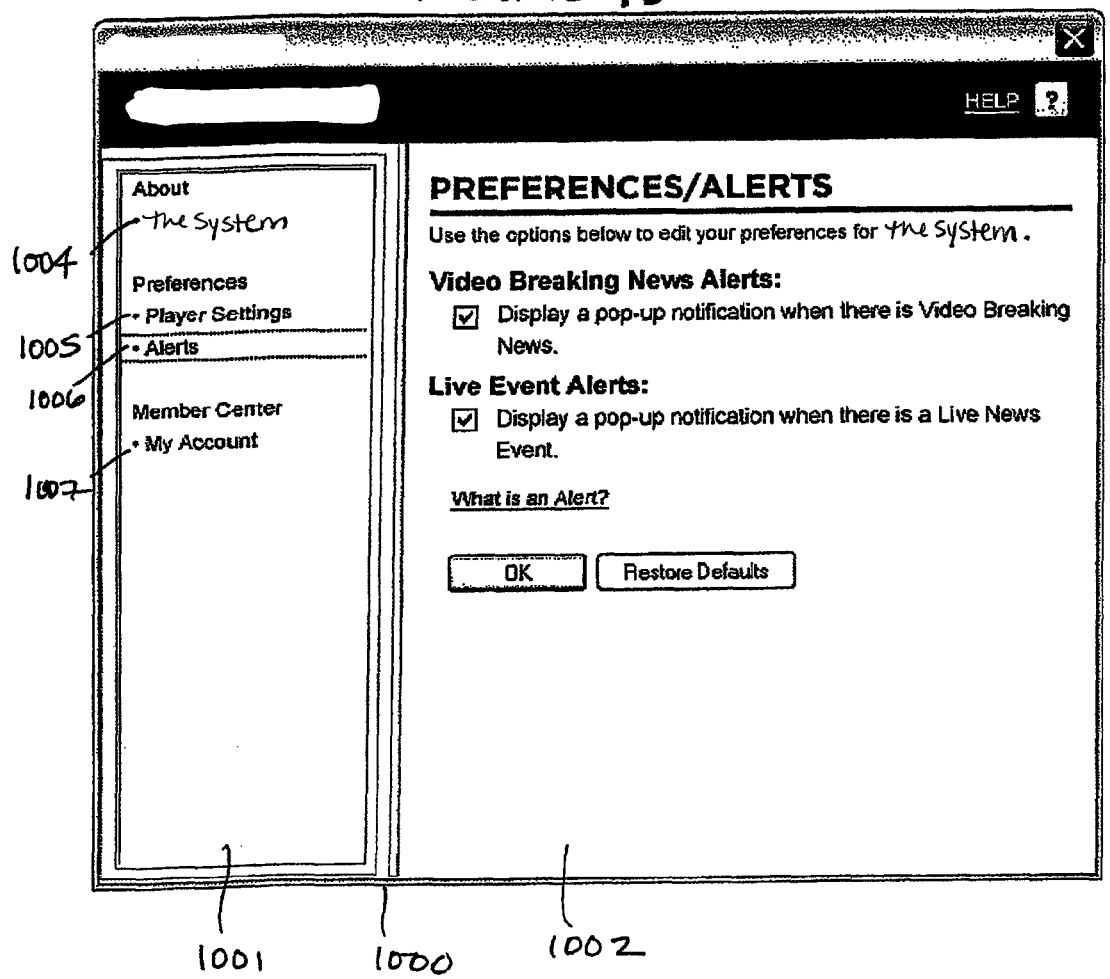

However, according to one embodiment of the invention, the user can select to receive alerts (e.g., breaking news or notification that a particular video will be or is currently streaming) while the client application 15 is running in system tray mode, such as shown in FIG. 16. According to one embodiment, the client application 15 is configured to display a pop-up display dialog window that displays breaking news or an upcoming video or audio feed that is or will be displayed by the client application 15. For example, in one embodiment, the exemplary alert dialog box 1100 shown in FIG. 19 includes a brief title or description of the current or upcoming video or audio feed or the breaking news, an indication of when the video or audio feed will begin if it has not already started, and a "watch now" button that can be selected by the user to instruct the client application 15 to open the main player dialog window 400 and display the event or breaking news shown in the alert dialog box 1100. In another embodiment, the alert dialog box (not shown) includes a "record" icon that when selected by the user, sends a request to the client application 15 to record the event listed in the alert dialog box.

Additional Functionality

In addition, according to one embodiment, when the user closes the system, by, for example, selecting a "close" button, the application runs in system tray mode. The user can close the application completely by right clicking on the icon in the system tray and selecting "exit" from the pop-up menu. Alternatively, the user can set up the application to close completely when the close button is selected from the main display dialog window.

In one embodiment, the user may view advertising content by selecting an "advertiser showcase" button from the main display dialog window. The system then displays advertiser content in an external browser window. In addition, the system according to one embodiment allows the user to view and search help information. The user can select a "help" button from the main display dialog window, and upon selection, the system opens a static URL in an external window that allows the user to browse and search for help information.

In various embodiments, the user can group on-demand video feeds and recorded live video feeds into genres (e.g., Local News, Regional News, U.S. News, World News, Sports, ACC Sports, SEC Sports, Entertainment, and Weather).

Furthermore, according to one embodiment, the user can enter comments into the client application 15 related to a particular video feed playing in the primary video pane 401. For example, the user can select a "your voice" tab in the main display dialog window 400, which instructs the client application 15 to display a "your voice" dialog window 900. The user can enter the user's full name, email address, and the user's comments into the "your voice" dialog window 900 and submit the comments to the client application 15 by selecting the "send" button. Furthermore, the user can toggle a check box to indicate whether the user's name can be posted with the comment on the client computing devices 115 of other users.

In addition, according to one embodiment of the invention, when the client application 15 has been minimized but not closed or switched into system tray mode, the client application includes a bar on the taskbar. In addition, the user can right click on the system icon displayed in the system tray on the display of the client computing device 115 to view links to one or more of the following options: use the help feature, configure alert preferences, configure user preferences, open the application to a display mode, and exit the application.

Account Preferences

Figure 14:
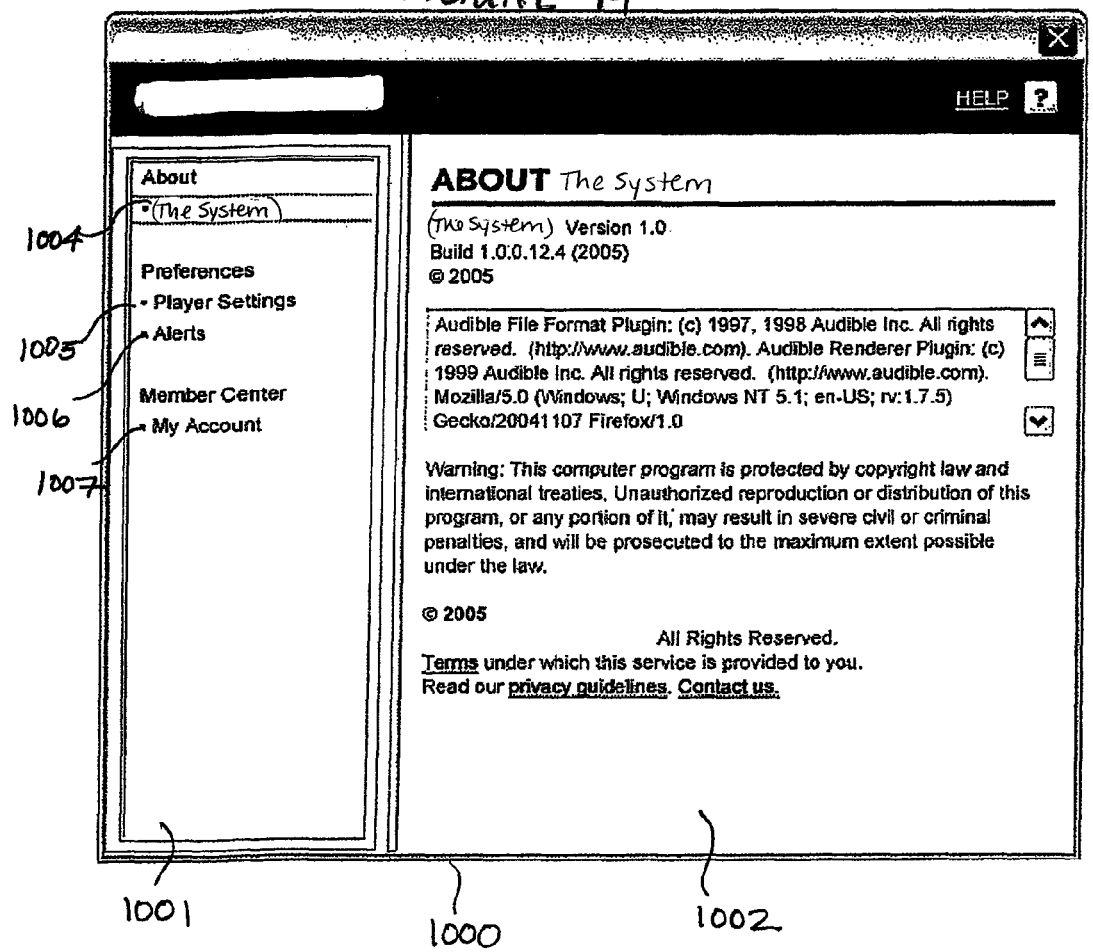
Figure 15:
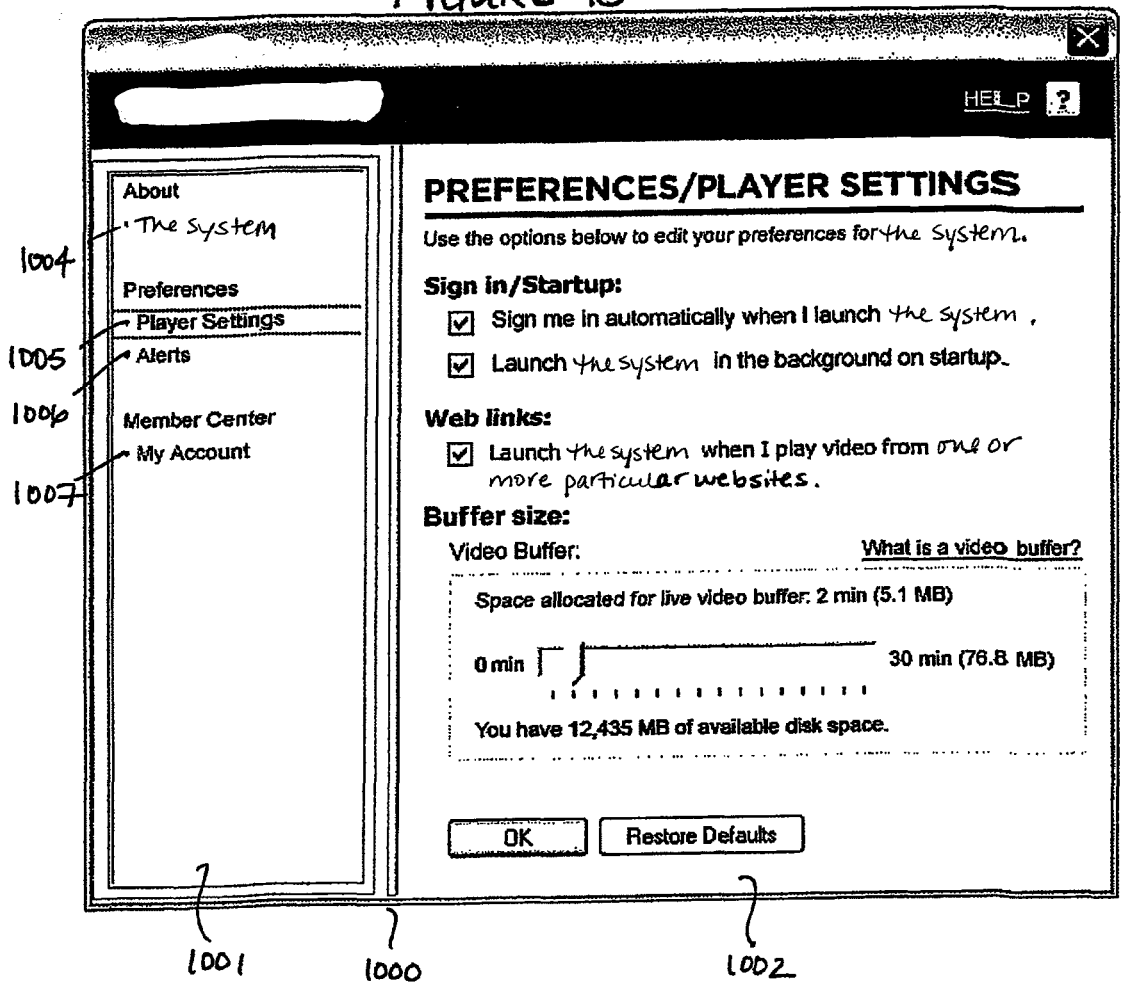
Figure 17:
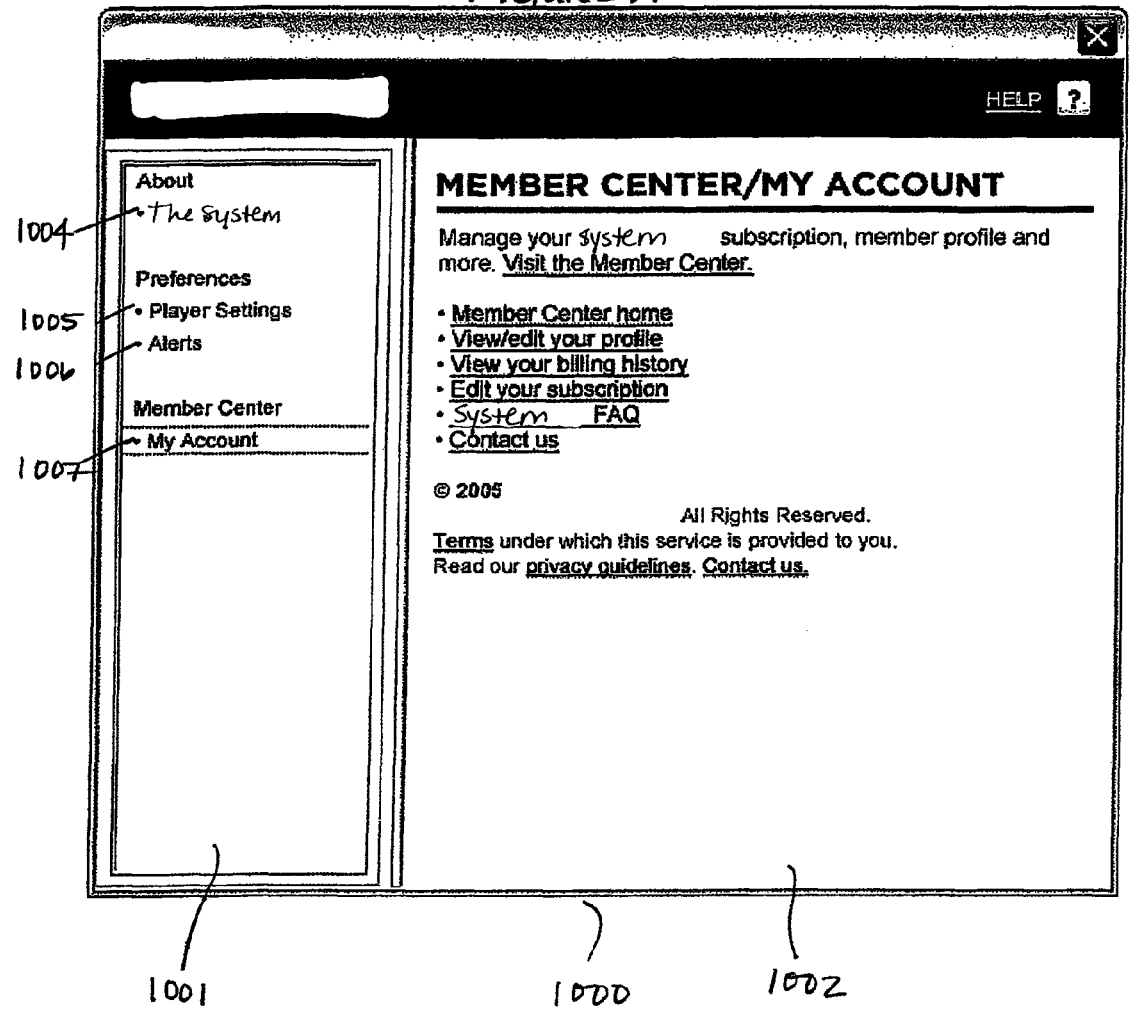

In one embodiment of the invention, the client application 15 is configured to display one or more account preferences dialog windows that allow the user to select certain preferences regarding how the system 10 operates on the user's client computing device 115. Exemplary account preferences dialog windows are shown in FIGS. 14-17. According to one embodiment, the main display dialog window 400 includes a "preferences" button 460, tab, or link that can be selected by user to instruct the client application 15 to display an account preferences dialog window, such as the exemplary account preferences dialog window 1000 shown in FIGS. 14-17. The account preferences dialog window 1000 according to the embodiment shown in FIGS. 14-17 includes a menu pane 1001 and an information pane 1002. The menu pane 1001 includes a list of options that the user can select to see more information about the option in the information pane 1002. For example, the user can select an "about" link 1004 in the menu pane 1001 to view information about the application (e.g., version number, copyright information, file format information, and legal notices), as shown in FIG. 14. In addition, the user can select a "player settings" link 1005 in the menu pane 1001 to view current player settings and change player settings (e.g., whether to sign in automatically to the system when the system is launched, whether to launch the system upon startup of the client computing device, whether to launch the application when the user selects video to play from particular websites, whether the system default setting should be used, and how much space the application should allocate for live video buffer such as, for example, from 0 minutes to 30 minutes of buffer time) in the information pane 1002, as shown in FIG. 15. In addition, the user can select a "my account" link 1007 in the menu pane 1001 to view and edit account settings, such as a user profile, billing information, billing history, subscription status, FAQs, and contact information for the application, in the information pane 1002, as shown in FIG. 17.

Furthermore, according to various embodiments, the user can select an "alert" link 1006 in the menu pane 1001 to view and change alert settings in the information pane 1002, as shown in FIG. 16. For example, the user can specify whether the user wants the client application 15 to display a pop-up notification when there is a breaking news event, whether the user wants to display a pop-up notification when there is live video event playing or upcoming, or whether user wants to use the system default settings. In addition, the user can specify whether the user prefers to receive a textual-based alert or an audio alert (e.g., shout downs discussed above) or whether the user prefers to receive alerts at all (not shown). In one embodiment, the user may specify a preference to be alerted if new or soon-to-be-available content is within a particular category or genre. Furthermore, in a particular embodiment, the user may specify that video and/or audio content that is associated with a particular category and is the subject of an alert be recorded to the client computing device 115 when the content becomes available.

In one embodiment, the client application 15 is configured for determining whether the user of the client computing device 115 is actively viewing video content. By detecting when the user is not actively viewing video content, the system 10 can save bandwidth by ceasing delivery of content to the user's computing device 115, according to one embodiment. For example, the client application 15 may determine whether the user is actively viewing video content by requesting that the user provide input to the client application 15 or by monitoring the input from the user over a particular time period (e.g., 5 minutes, 10 minutes, or 15 minutes). In addition, the client application 15 may determine that the user is not actively viewing video content if the user interface is minimized.

If the client application 15 determines that the user of the client computing device 115 is actively viewing video content, content, according to various embodiments, continues to stream to the user's client computing device 115. In addition, in one embodiment, if the client application 15 detects that the user desires to actively resume viewing the user interface, the client application 15 is configured to notify the content delivery server 25 to resume streaming of the content to the user's client computing device 115. For example, in one embodiment, the client application 15 may receive input from the user or the user may restore the user interface to an active window from a minimized window.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

The invention claimed is:

1. A content delivery system for streaming live video content to one or more client computing devices over a network, said system comprising:
   a content delivery server configured for streaming video content for two or more live videos over a network substantially concurrently, wherein a first live video is streamed over the network by said content delivery server at a resolution higher than a second live video streamed over the network by said content delivery server;
   at least one client computing device in communication with the content delivery server over said network, said client computing device running a client application, the client application having a media player component configured for receiving the video content from said content delivery server, decoding the video content, and displaying at least the first and second live videos substantially concurrently to a user, the first live video being displayed at a higher resolution than the second live video:
   wherein the first live video is displayed in a first pane and the second live video is displayed in a second pane, the first pane and the second pane being displayed as part of a single user interface window;
   wherein the user interface window further comprises a text pane, and the client application is further configured for displaying text information related to the first live video in the text pane and maintaining the association of the text information displayed in the text pane and the first live video displayed in the first pane; and
   wherein the text information comprises a hyperlink to a website related to the particular selected live video displayed in the first pane, and wherein the client application is further configured for instructing said client computing device to launch a new browser to display the website in response to selection of the hyperlink by the user.

2. A content delivery system according to claim 1 wherein the displayed videos further comprise a third video, the third video being streamed to the at least one client computing device in a resolution lower than the resolution of the first live video and displayed in a third pane that is part of the single user interface window, and wherein:
   said content delivery server is further configured for:
      streaming a high resolution version and a low resolution version for each of the first, second, and third live videos, and
   the client application is further configured for:
      receiving a selection of one of the first, second, third live videos from a user,
      in response to receiving the selection, requesting said content delivery server to stream the high resolution version of the selected live video and the low resolution versions of the non-selected live videos to the client application,
      receiving the high resolution version of the selected live video and the low resolution versions of the non-selected live videos from said content delivery server, and
      in response to receiving the high resolution version of the selected video and the low resolution versions of the non-selected videos, decoding and displaying the high resolution version of the selected video in the first pane.

3. A content delivery system according to claim 2 wherein the low resolution versions of the non-selected live videos are decoded and displayed in the second pane and a third pane, the second and third panes being smaller than the first pane.

4. A content delivery system according to claim 2 wherein:
   each of the first live video, the second live video, and the third live video are associated with audio content,
   said content delivery server is further configured for streaming the audio content associated with the selected live video to the client application substantially concurrently with the video content of the selected live video, and
   the client application is further configured for receiving, decoding, and playing the audio content substantially in synch with the display of the selected live video.

5. A content delivery system according to claim 4 wherein the audio content is streamed to said content delivery server from a source independent of a source of the selected live video.

6. A content delivery system according to claim 2 wherein:
   each of the first live video, the second live video, and the third live video are associated with audio content,
   said content delivery server is further configured for encoding the audio content associated with the selected video and the selected video content with time stamps and streaming the encoded audio content and the encoded selected video content to the client application substantially concurrently, and
   the client application is further configured for receiving, decoding, and playing the audio content substantially in synch with the selected video content by comparing the time stamps of the audio content and the selected video content and playing the audio content and the selected video content such that the time stamps of each substantially correspond.

7. A content delivery system according to claim 2 wherein: said content delivery server is further configured for:
- receiving a selection of a live video chosen from the two or more live videos from one or more users of said one or more client computing devices;
- maintaining a record of the live videos selected by the one or more users;
- determining which of the live videos is requested most often by the one or more users;
- generating a list of the one or more live videos determined to be requested most often; and
- transmitting the list to the client applications running on each of said one or more client computing devices for display to the user of each of said client computing devices.

8. A content delivery system according to claim 7 wherein the client application is configured for:
- receiving the selection of the live video chosen from the two or more live videos from the user of said client computing device running the client application, each live video being associated with metadata identifying one or more genres to which the live video belongs;
- maintaining a record of the live videos selected by the user and the one or more genres to which each selected live video belongs;
- determining which genre the user tends to prefer based on the record of the live videos selected by the user and the one or more genres to which each selected live video belongs;
- generating a list of additional live videos within the genre determined to be preferred by the user; and
- displaying the list of the additional live videos to the user.

9. A content delivery system according to claim 1 wherein the text information comprises a link to an on-demand video related to the selected live video displayed in the first pane, and wherein the client application is further configured for displaying the on-demand video in response to selection of the link by the user.

10. A content delivery system according to claim 1 wherein the text information comprises a blog of comments received from said content delivery server, the blog of comments being synchronized with the selected video content.

11. A content delivery system according to claim 1 wherein the first pane is smaller than the second pane.

12. A content delivery system according to claim 1 wherein the first video is received by said content delivery server from a first source and second video is received by said content delivery server from a second source, the first source and the second source being independent of each other.

13. A content delivery system according to claim 1 wherein the client application is further configured for:
- receiving a request from the user to browse through live video content available for viewing;
- in response to receiving the request, generating a request for said content delivery server to stream an additional live video in low resolution to said client computing device, the additional live video not being currently displayed on said client computing device at the time the request is received from the user;
- in response to receiving video content associated with the additional video, decoding and displaying the video content for the additional live video in low resolution within the single user interface window.

14. A content delivery system according to claim 13 wherein the client application is further configured for displaying the additional live video in the second pane and ceasing display of the second video.

15. A content delivery system according to claim 13 wherein the client application is further configured for displaying the additional live video in a third pane that is part of the single user interface window.

16. A content delivery system according to claim 15 wherein the third pane is adjacent the second pane.

17. A content delivery system according to claim 13 wherein the client application is further configured for displaying the additional live video and ceasing display of at least one live video that was being displayed in low resolution at the time the request was received from the user.

18. A content delivery system according to claim 1 wherein the user interface comprises two or more scrollable ribbons, each scrollable ribbon comprising at least one pane for displaying one or more available live videos, and each scrollable ribbon being collapsible and expandable, wherein the client application is configured for displaying the one or more available live videos associated with an expanded scrollable ribbon in a pane in the expanded scrollable ribbon and not displaying the one or more live videos associated with a collapsed scrollable ribbon.

19. A content delivery system according to claim 18 wherein each of the scrollable ribbons are associated with a particular category of videos to be displayed within the scrollable ribbon.

20. A content delivery system according to claim 1 wherein the client application is configured for:
- displaying at least one scrollable ribbon, each scrollable ribbon comprising one or more panes and each of the one or more panes displaying an available live video;
- receiving a request from the user to scroll through the available videos on one of the at least one scrollable ribbons; and
- in response to receiving the user's request to scroll through the available live videos on the scrollable ribbon, moving the location of the panes and the live videos displayed therein through the scrollable ribbon such that at least one new pane displaying a live video that was not displayed when the request was received by the client application is displayed.

21. A content delivery system according to claim 1 wherein the first video is received by said content delivery server from a first computing device in communication with said content delivery server and the second video is received by said content delivery server from a second computing device in communication with said content delivery server, the first computing device being independent from the second computing device.

22. A content delivery system according to claim 1 wherein said content delivery server is configured for streaming one or more on-demand, pre-recorded videos substantially concurrently with the live videos.

23. A content delivery system according to claim 1 wherein one or more of the live videos are associated with audio content, said content delivery server is further configured for streaming the audio content with the one or more live videos, and the client application is configured for receiving, decoding, and playing the audio content substantially in synch with the live video being displayed.

24. A content delivery system according to claim 1 wherein the network is the Internet.

25. A content delivery system according to claim 1 wherein the media player component of the client application is Windows Media Player™, QuickTime™, RealPlayer™, and Adobe Flash Player™.

26. A content delivery system according to claim 1 wherein the client application is configured for receiving alert content from the content delivery server, the alert content providing information to the user related to one of the videos available to be displayed to the user.

27. A content delivery system according to claim 26 wherein the alert content is text, and the client application is configured for displaying the text on said client computing device.

28. A content delivery system according to claim 26 wherein the alert content is audio content streamed to said client computing device from said content delivery server, and wherein the client application is further configured for receiving, decoding, and playing the audio content of the alert when the alert is received.

29. A content delivery system according to claim 28 wherein the client application is configured for muting any audio content associated with the first video that is being played when the audio content of the alert is received.

30. A content delivery system according to claim 28 wherein the client application is configured for reducing a decibel level of any audio content associated with the first video that is being played when the audio content of the alert is received.

31. A content delivery system according to claim 28 wherein the client application is configured for receiving a request from the user to mute the play of the audio content of the alert, and in response to receiving the request, ceasing the play of the audio content of the alert.

32. A content delivery system according to claim 26 wherein the client application is configured for:
    receiving from the user of said client computing device a preference indicating whether the user prefers to receive textual or audio-based alert content;
    in response to receiving the preference from the user and the preference indicating that the user prefers to receive textual-based alert content, displaying the textual-based alert content to the user when the textual-based alert content is received from the content delivery server; and
    in response to receiving the preference from the user and the preference indicating that the user prefers to receive audio-based alert content, playing the audio-based alert content to the user when the audio-based alert content is received from the content delivery server.

33. A content delivery system according to claim 26 wherein the client application is configured for:
    receiving from the user of said client computing device a preference indicating whether the user prefers to receive alert content;
    in response to receiving the preference from the user and the preference indicating that the user prefers not to receive alert content, not presenting the alert content when the alert content is received from the content delivery server; and
    in response to receiving the preference from the user and the preference indicating that the user prefers to receive alert content, presenting the alert content to the user when the alert content is received from the content delivery server.

34. A content delivery system according to claim 26 wherein the alert content comprises announcements of changes in the video content to be displayed, upcoming news, or breaking news.

35. A content delivery system according to claim 1 wherein the client application is configured for:
    retrieving one or more operating specifications of said client computing device;
    comparing the operating specifications to a set of minimum operating specifications;
    in response to the one or more operating specifications not meeting a particular minimum specification, ceasing to stream video content associated with one or more of the live videos.

36. A content delivery system according to claim 1 wherein the client application is configured for:
    retrieving one or more operating specifications of said client computing device;
    comparing the operating specifications to a set of minimum operating specifications;
    in response to the one or more operating specifications not meeting a particular minimum specification, notifying the user that the particular operating specification is not met.

37. A content delivery system according to claim 1 wherein metadata identifying a subject matter of each live video is associated with each live video and wherein the client application is configured for:
    receiving a request from the user to search for videos related to a particular subject matter;
    in response to receiving the request from the user, sending a request to said content delivery server for a list of videos related to the particular subject matter;
    receiving the list of videos related to the particular subject matter; and
    displaying the list videos related to the particular subject matter to the user.

38. A content delivery system according to claim 37 wherein the client application is further configured for:
    receiving a request from the user to play one of the videos included in the list of videos;
    in response to receiving the request from the user, sending a request to said content delivery server to stream the requested video to said client computing device;
    receiving the video content for the requested video from said content delivery server; and
    decoding and displaying the video content for the requested video.

39. A content delivery system for streaming live video content to one or more client computing devices over a network, said system comprising:
    a content delivery server configured for streaming video content for two or more live videos over a network substantially concurrently, wherein a first live video is streamed over the network by said content delivery server at a resolution higher than a second live video streamed over the network by said content delivery server;
    at least one client computing device in communication with the content delivery server over said network, said client computing device running a client application, the client application having a media player component configured for receiving the video content from said content delivery server, decoding the video content, and displaying at least the first and second live videos substantially concurrently to a user, the first live video being displayed at a higher resolution than the second live video;

wherein said content delivery server is further configured for:

receiving a selection of a live video chosen from the two or more live videos from one or more users of said one or more client computing devices;

maintaining a record of the live videos selected by the one or more users; determining which of the live videos is requested most often by the one or more users;

generating a list of the one or more live videos determined to be requested most often;

transmitting the list to the client applications running on each of said one or more client computing devices for display to the user of each of said client computing devices; and wherein the two or more live videos are each associated with metadata identifying one or more genres to which the each live video belongs; and wherein the client application is further configured for:

maintaining a record of the one or more genres to which each selected live video belongs;

determining one or more preferred genres for each of the one or more users based on the record of the live videos selected by each user and the one or more genres to which each selected live video belongs;

generating a list of additional live videos within the one or more preferred genres for each of the one or more users; and displaying to each user the list of the additional live videos generated for the respective user.

40. A content delivery system for streaming live video content to one or more client computing devices over a network, said system comprising:

a content delivery server configured for streaming video content for two or more live videos over a network substantially concurrently, wherein a first live video is streamed over the network by said content delivery server at a resolution higher than a second live video streamed over the network by said content delivery server;

at least one client computing device in communication with the content delivery server over said network, said client computing device running a client application, the client application having a media player component configured for receiving the video content from said content delivery server, decoding the video content, and displaying at least the first and second live videos substantially concurrently to a user, the first live video being displayed at a higher resolution than the second live video;

wherein the client application is further configured for:

displaying one or more scrollable ribbons substantially concurrently with at least the first live video, each scrollable ribbon comprising one or more panes displaying an available live video;

receiving a request from the user to scroll through the available videos on a select one of the one or more scrollable ribbons; and in response to receiving the user's request to scroll through the available live videos on the select scrollable ribbon, moving the location of the panes and the live videos displayed therein through the select scrollable ribbon such that at least one new pane displaying a live video that was not displayed when the request was received by the client application is displayed; and wherein each of the one or more scrollable ribbons is associated with a particular category of videos to be displayed within the scrollable ribbon.

41. The content delivery system of claim 40, wherein the one or more scrollable ribbons are collapsible and expandable, and wherein the client application is further configured for displaying one or more available live videos associated with an expanded scrollable ribbon in a pane in the expanded scrollable ribbon and not displaying one or more live videos associated with a collapsed scrollable ribbon.

42. A content delivery system for streaming live video content to one or more client computing devices over a network, said system comprising:

a content delivery server configured for streaming video content for two or more live videos over a network substantially concurrently, wherein a first live video is streamed over the network by said content delivery server at a resolution higher than a second live video streamed over the network by said content delivery server;

at least one client computing device in communication with the content delivery server over said network, said client computing device running a client application, the client application having a media player component configured for receiving the video content from said content delivery server, decoding the video content, and displaying at least the first and second live videos substantially concurrently to a user, the first live video being displayed at a higher resolution than the second live video;

wherein the client application is configured for receiving alert content from the content delivery server, the alert content providing information to the user related to one of the videos available to be displayed to the user; and wherein the alert content is audio content streamed to said at least one client computing device from said content delivery server, and wherein the client application is further configured for receiving, decoding, and playing the audio content of the alert when the alert is received.

43. The content delivery system of claim 42, wherein the alert content is text, and the client application is configured for displaying the text on said at least one client computing device.

44. The content delivery system of claim 42, wherein the alert content comprises announcements of changes in the video content to be displayed, upcoming news, or breaking news.

* * * * *